United States Patent
Tsutsui et al.

(10) Patent No.: US 6,854,967 B2
(45) Date of Patent: Feb. 15, 2005

(54) ELECTRIC INJECTION MOLDING MACHINE FOR CONTROLLING INJECTION SPEED AND INJECTION PRESSURE OF ELECTRIC INJECTION MOLDING MACHINE

(75) Inventors: Kenji Tsutsui, Aichi-ken (JP); Akihiro Maekawa, Hyogo-ken (JP); Tadashi Murata, Hyogo-ken (JP); Junji Murase, Aichi-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 149 days.

(21) Appl. No.: 10/168,866

(22) PCT Filed: Oct. 30, 2001

(86) PCT No.: PCT/JP01/09508

§ 371 (c)(1),
(2), (4) Date: Jun. 26, 2002

(87) PCT Pub. No.: WO02/36325

PCT Pub. Date: May 10, 2002

(65) Prior Publication Data

US 2002/0192322 A1 Dec. 19, 2002

(30) Foreign Application Priority Data

Oct. 31, 2000 (JP) .......................................... 2000-332869
Mar. 23, 2001 (JP) .......................................... 2001-86052

(51) Int. Cl.⁷ ............................................... B29C 45/77
(52) U.S. Cl. ..................... 425/145; 264/40.1; 264/40.5; 264/328.1; 425/149
(58) Field of Search ................................. 425/145, 149; 264/40.1, 40.5, 328.1

(56) References Cited

U.S. PATENT DOCUMENTS

| | | | |
|---|---|---|---|
| 5,445,773 A | * | 8/1995 | Arai .......................... 264/40.1 |
| 5,514,311 A | | 5/1996 | Shimizu et al. |
| 6,328,551 B1 | * | 12/2001 | Takatsugi et al. ........... 425/145 |
| 6,340,439 B1 | * | 1/2002 | Hiraoka ..................... 264/40.1 |
| 6,558,588 B2 | * | 5/2003 | Shioiri et al. .............. 264/40.1 |

FOREIGN PATENT DOCUMENTS

| | | |
|---|---|---|
| JP | 03-056887 | 8/1991 |
| JP | 04-044891 | 7/1992 |

(List continued on next page.)

*Primary Examiner*—Tim Heitbrink
(74) *Attorney, Agent, or Firm*—Oblon, Spivak, McClelland, Maier & Neustadt, P.C.

(57) ABSTRACT

The invention relates to an electric injecting molder and an injection velocity and injection pressure controlling method for an electric injecting molder, and it is an object of the present invention to make it possible, in injection molding by an electric injection molder, to mold stable resin products having a minimized dispersion in the quality even if the operation environment varies. When an injection screw (23) disposed in an injection cylinder (22) is driven to move in forward and backward directions by an electric motor (29A) to inject resin material (3) in the injection cylinder (22) into a metal mold (1, 2) to fill the metal mold (1, 2), the electric motor (29A) is first velocity-controlled to fill the resin material (3) into the metal mold (1, 2), and, after the filling, the electric motor (29A) is pressure-controlled to replenish the resin material for shrinkage of the resin. Upon the velocity control, a velocity target value for the injection screw (23) is corrected in response to a force detection value so that the velocity target value for the injection screw (23) may decrease as the force detection value increases to perform velocity feedback control of the electric motor (29A) so that a velocity detection value from velocity detection means may be equal to the velocity target value.

15 Claims, 10 Drawing Sheets

FOREIGN PATENT DOCUMENTS

| | | |
|---|---|---|
| JP | 04-050172 | 8/1992 |
| JP | 04-347616 | 12/1992 |
| JP | 6-28253 | 8/1994 |
| JP | 7-67722 | 7/1995 |
| JP | 2660636 | 10/1997 |
| JP | 10-113970 | 5/1998 |
| JP | 2866361 | 3/1999 |
| JP | 2921754 | 4/1999 |

* cited by examiner

FIG. 10 (a) PRIOR ART
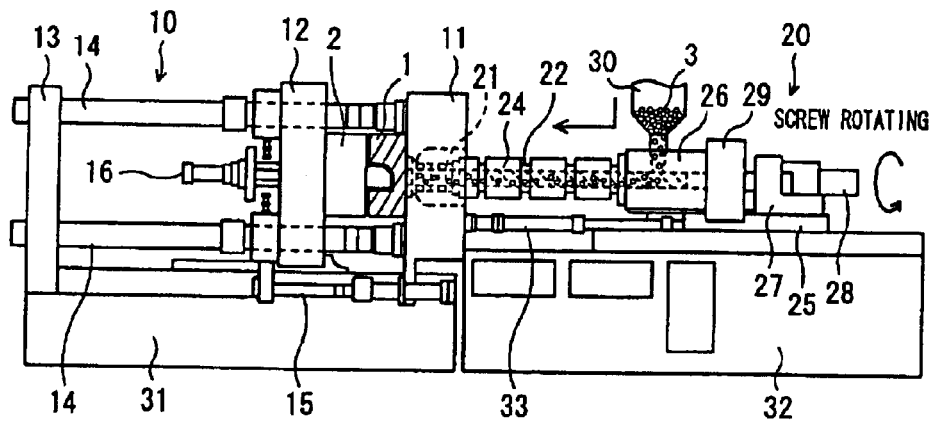
FIG. 10 (b) PRIOR ART
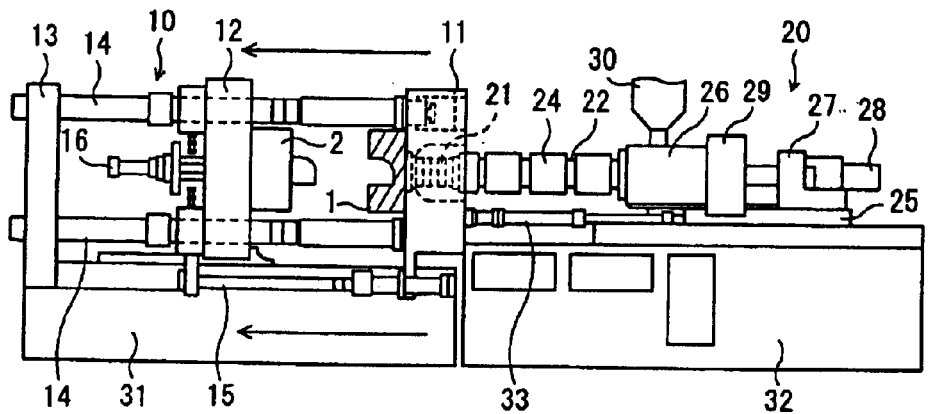
FIG. 10 (c) PRIOR ART
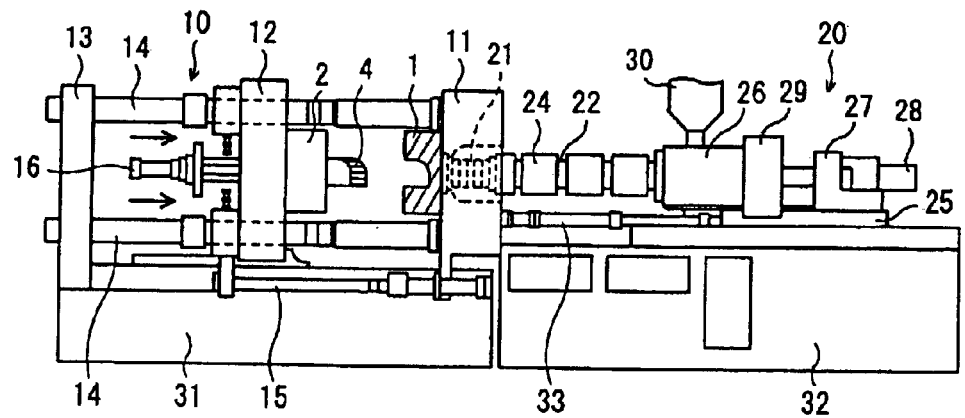

ELECTRIC INJECTION MOLDING MACHINE FOR CONTROLLING INJECTION SPEED AND INJECTION PRESSURE OF ELECTRIC INJECTION MOLDING MACHINE

TECHNICAL FIELD

This invention relates to an electric injection molder and an injection velocity and injection pressure controlling method for an electric injection molder wherein an injection screw is driven to move in back and forth directions by an electric motor and the electric motor is controlled in accordance with two control modes of velocity control and pressure control.

BACKGROUND ART

As shown in FIGS. 9(a) to 9(c) and 10(a) to 10(c), an injection molder stacks two metal molds 1 and 2, and supplies a raw resin (resin material) 3 into a space formed between the metal molds 1 and 2 to mold a resin product having a desired shape. To this end, the injection molder includes a mold closing apparatus 10 for stacking the two metal molds 1 and 2 and an injection apparatus 20 for injecting and supplying the raw resin 3 into the space formed between the metal molds 1 and 2. It is to be noted here that the metal mold 1 is formed in a concave shape, and the metal mold 2 is formed in a convex shape.

The mold closing apparatus 10 includes a fixed die plate 11 fixed on a base 31 on which the metal mold 1 is mounted, a movable die plate 12 on which the other metal mold 2 is mounted and which can move toward and away from the fixed die plate 11, a tie bar 14 having one end connected to the fixed die plate 11 and the other end connected to a connecting plate 13 for guiding movement of the movable die plate 12, and a boost cylinder 15 for driving the movable die plate 12.

Consequently, if the boost cylinder 15 is operated, then the metal mold 2 is moved toward and away from the metal mold 1 together with the movable die plate 12 under the guidance of the tie bar 14. When the metal molds 1 and 2 are stacked, the boost cylinder 15 presses the metal mold 2 to the metal mold 1 to oppose the pressure of the resin into the space between the metal molds 1 and 2.

The movable die plate 12 includes an extrusion cylinder 16 for taking out a resin product 4 fitted on the convex metal mold 2 side after molding.

Meanwhile, the injection apparatus 20 includes an injection cylinder 22 having a nozzle 21 provided at a tip thereof, an injection screw 23 inserted for back and forth movement and for rotation in the injection cylinder 22, a heater 24 for heating the raw resin 3 in the injection cylinder 22, a table (driving apparatus table) 25 fixed on a base 32, a fixed frame 26 fixed on the table 25 for supporting the injection cylinder 22, a movable frame 27 which is mounted for movement on the table 25 and to which the injection screw 23 is connected, a screw rotating motor 28 mounted on the movable frame 27 for driving the injection screw 23 to rotate, an injection screw moving mechanism 29 mounted between the fixed frame 26 and the movable frame 27 for moving the injection screw 23 together with the movable frame 27 in an axial direction, and a hopper 30 for supplying the raw resin 3 into the injection cylinder 22.

It is to be noted that a nozzle forward and backward moving cylinder 33 for moving the table 25 in an axial direction of the injection cylinder 22 to adjust the position of the nozzle 21 forwardly or backwardly is provided between the table 25 and the fixed die plate 11.

Consequently, it is possible, by rotating the injection screw 23 by means of the screw rotating motor 28, to introduce the raw resin 3 in the form of pellets from the hopper 30 into the injection cylinder 22 and feed the raw resin 3 forwardly. Thereupon, the raw resin 3 can be melted by heating the raw resin 3 by means of the heater 24. Then, the injection screw 23 is advanced by operating the injection screw moving mechanism 29, and as a result, the molten resin accumulated in the nozzle 21 can be injected into the space between the metal molds 1 and 2.

In the injection molding apparatus described above, the injection molding is performed in such a manner as shown in FIGS. 9(a) to 9(c), 10(a) to 10(c) and 11.

In particular, the movable die plate 12 is first set to such an original position as shown in FIG. 9(a) (an original position setting step, step S1 of FIG. 11). Then, the movable die plate 12 is moved as shown in FIG. 9(b) to stack the metal molds 1 and 2 to perform mold closing (a mold closing step, step S2 of FIG. 11).

Then, the molten resin for one shot is accumulated in the nozzle 21. Then, as shown in FIG. 9(c), the injection screw 23 is advanced by operating the injection screw moving mechanism 29 so that the molten resin is injected into the space between the metal molds 1 and 2 while the molten resin is pressurized (a pressurization and injection step, step S3 of FIG. 11)

After the molten resin is injected into the space between the metal molds 1 and 2, the pressurized pressure state is kept for a predetermined period of time using a timer or the like. Since the resin shrinks to decrease its volume when the resin solidifies, the injection screw 23 is advanced to replenish the resin for the shrinkage (dwelling step, step S4 of FIG. 11) as shown in FIG. 10(a). Thereafter, the molded product is cooled, and the screw rotating motor 28 and the injection screw moving mechanism 29 are operated to keep the molten resin pressure to a certain pressure. In this state, the raw resin 3 in the form of pellets thrown in the hopper 30 is melted and fed by rotating the injection screw 23 to accumulate the resin for one shot in the nozzle (cooling and metering step, step S5).

After the cooling and metering step is completed (step S6 of FIG. 11), the movable die plate 12 is moved to separate the metal molds 1 and 2 away from each other to perform mold opening (mold opening step, step S7 of FIG. 11) as shown in FIG. 10(b). Then, as shown in FIG. 10(c), the extrusion cylinder 16 is operated to extrude the resin product 4 fitted on the side of the convex metal mold 2 (product extruding step, step S8 of FIG. 11). Thereafter, the steps from the mold closing step (step S2 of FIG. 11) to the product extruding step (step S8 of FIG. 11) are carried out again until a molding completion decision (step S9 of FIG. 11) is made.

It is to be noted that, while the injection molding is performed in such a manner as described above, as an injection molder, there is an electric injection molder which uses an electric motor for the injection screw moving mechanism 29 in addition to a hydraulic injection molder which uses a fluid pressure cylinder such as a hydraulic cylinder for the injection screw moving mechanism 29. The electric injection molder can control, when compared with the hydraulic injection molder, the back and forth movement of the injection screw in a high degree of accuracy and in various forms.

Thus, when injection molding is performed in such a manner as described above by the electric injection molder, in the pressurization and injection step (step S3 of FIG. 11) for filling the resin into the metal mold, since the resin becomes solidified if the temperature of the resin drops during filling, the velocity of the injection screw is controlled upon such resin filling to prevent the solidification of the resin. Further, in the dwelling step and the cooling and metering step (steps S4 and S5 of FIG. 11) after the resin filling, the pressure of the injection screw is controlled for dwelling in order to correct the shrinkage occurring by the cooling of the resin is controlled.

In the resin filling step (pressurization and injection step), the electric motor for driving the injection screw to move back and forth is controlled so that the moving velocity in the forward and backward direction of the injection screw may be equal to a target velocity. Further, in the dwelling step and so forth after the resin filling, the electric motor for driving the injection screw to move back and forth is controlled so that the resin pressure by the injection screw maybe equal to a target pressure.

Therefore, it is necessary in the molding step to change over the driving control of the injection screw between the two control modes of the velocity control and the pressure control. Conventionally, the changeover (called V/P changeover) between the velocity control and the pressure control is performed in accordance with the position of the injection screw. Then, the position of the injection screw used as a changeover reference in the case described above is set based on an operation step when a skilled operator performs the injection molding several times by manual operation until high-quality molding is achieved successfully.

For example, FIG. 12 is a block diagram showing a conventional control apparatus for controlling the forward and backward movement of the injection screw upon injection molding.

As shown in FIG. 12, in the present control apparatus, the velocity control is performed in such a manner as described below. In particular, a deviation (Xr–X) between a position instruction value Xr which is a target value of the motor position (rotational angle) and a position detection value X which is a found value of the motor position (rotational angle) is calculated (adder 71), and the deviation (Xr–X) is multiplied by a position proportion gain Kp by a gain processing section 72 to convert it into a velocity-corresponding instruction value [Vr=Kp(Xr–X)]. Then, a deviation (Vr–V) between the velocity instruction value Vr and a velocity detection value V which is a found value of the motor velocity (rotational velocity) is calculated (adder 73), and a motor instruction value (current instruction value) is set based on the deviation (Vr–V) by a velocity control section 74 and outputted.

Further, in the control apparatus, the pressure control is performed in such a manner as described below. In particular, pressure instruction values P1 and P2 which are target values of the pressure (resin pressure) in the space between the metal molds are set. The pressure instruction value P1 is utilized for regulating so that the pressure in the space between the metal molds does not excessively rise upon the velocity control and for performing changeover from the velocity control to the pressure control. The other pressure instruction value P2 is utilized upon the pressure control.

Thus, in a changeover section 75, based on a V/P changeover signal, the pressure instruction value P1 is selected upon the velocity control (upon V control), but the pressure instruction P2 is selected upon the pressure control (upon P control). A deviation (Pr–P) between the selected pressure instruction value P1 or P2 (hereinafter referred to as Pr) and a pressure detection value P which is a found value of the pressure in the space between the metal molds is calculated (adder 76), and a motor instruction value (current instruction value) is set based on the deviation (Pr–P) by a pressure control section 77 and is outputted.

While selective changeover between the motor instruction value from the velocity control section 74 and the motor instruction value from the pressure control section 77 is performed by a changeover section 78, the changeover section 78 selects a motor instruction value having a lower value from between the motor instruction values just mentioned (low select). In a final stage of the velocity control, the viscosity of the raw resin increases because of temperature dropping as the position of the injection screw approaches a filling completion state, and the deviation (Xr–X) between the position instruction value Xr and the position detection value X becomes less liable to decrease. As a result, the actual velocity drops in a state wherein the velocity instruction value Vr does not decrease, and the motor instruction value from the velocity control section 74 increases.

At this time, the pressure instruction value P1 is selected, and the motor instruction value from the velocity control section 74 is higher than the motor instruction value from the pressure control section 77 which is based on the pressure instruction value P1, and as a result, the motor instruction value from the pressure control section 77 is selected. In other words, changeover from the velocity control to the pressure control is performed. Upon the pressure control, the pressure instruction value P2 is selected, and a motor instruction value from the pressure control section 77 which is based on the pressure instruction value P2 is inputted to the changeover section 78.

It is to be noted that the technique wherein the changeover between the velocity control and the pressure control is performed through the low select of the motor instruction value in such a manner as described above is disclosed in the official gazettes of Japanese Patent Laid-Open No. 369520/1992 and Japanese Patent No. 2660636.

Further, in the official gazette of Japanese Utility Model Publication No. 28253/1994, an apparatus is disclosed which performs automatic changeover among a velocity control circuit which controls the resin pressure by controlling the velocity of a servomotor upon dwelling, a position control circuit which controls the position and the velocity of the servomotor based on information from a position detection section, and a velocity control circuit which controls a velocity instruction value based on a deviation amount between a dwelling instruction signal upon dwelling and an actual dwell value outputted from a pressure sensor using a switching circuit.

Furthermore, in the official gazette of Japanese Patent Publication No. 67722/1995, a technique is disclosed wherein, when a screw actual thrust is higher than a preset value, a control signal for controlling the rotational velocity of an electric motor is outputted so that an actual thrust may be equal to the set thrust, but, when the screw actual thrust is lower than the preset value, another control signal for controlling the rotational velocity of the electric motor so that the screw may advance at the set velocity is outputted, and the rotational velocity of the electric motor is controlled in accordance with either one of the control signals described above and velocity and position feedback signals.

Meanwhile, also a technique is available wherein changeover between the velocity control and the pressure control (V/P changeover) is performed in response to the position of the injection screw. In this instance, the position of the injection screw used as a changeover reference is set based on an operation step when a skilled operator performs the injection molding several times by manual operation until high-quality molding is achieved successfully.

However, in the apparatus (shown in FIG. 12) which performs selection between the motor instruction value utilized for the velocity control and the motor instruction value utilized for the pressure control through the low select in such a manner as described above, the apparatus disclosed in the official gazette of Japanese Patent Utility Model Publication No. 28253/1994, and the apparatus disclosed in the official gazette of Japanese Patent Publication No. 67722/1995, it sometimes occurs that the changeover between the velocity control and the pressure control is performed frequently, and as a result, there is a disadvantage that the control is not stabilized.

In particular, in a situation wherein the control mode is changed over from the velocity control to the pressure, since the viscosity of the filled resin rises and the filled resin solidifies gradually, the state of the resin is very unstable, and therefore, the motor instruction value utilized for the velocity control and the motor instruction value utilized for the pressure control are not stabilized. Therefore, if the selection between the motor instruction value utilized for the velocity control and the motor instruction value utilized for the pressure control is performed through the low select in such a manner as described above, then the changeover between the velocity control and the pressure control is performed frequently, and as a result, the control is not stabilized. Consequently, not only the filling of the resin cannot be performed stably but also there is the possibility that some dispersion may occur in the quality of the molded products.

Further, in the technique wherein the changeover between the velocity control and the pressure control is performed in response to the position of the injection screw based on a result of performance by a skilled operator, if the V/P changeover is performed in response to the position of the injection screw set in advance, then the filling of the resin cannot be performed stably, and there is the possibility that dispersion may occur in the quality of the molded products.

In particular, the quality (shape, dimension and so forth) of the resin product by the injection molding is liable to be influenced by the operation environment such as the temperature and the humidity. Therefore, if the V/P changeover is performed in response to a fixed position of the injection screw using the conventional velocity control or pressure control, then the quality of the resin product varies in response to variation of the operation environment, and the dispersion of the resin product increases.

It is to be noted that, as the technique relating to such changeover between the velocity control and the pressure control as described above, in the official gazette of Japanese Patent No. 2866361 and the official gazette of Japanese Patent No. 2921754, a technique is disclosed wherein the gain relating to the pressure feedback is set lower than that in normal operation immediately after the control mode is changed over to the pressure control to raise the stability of the pressure feedback. In this case, even if the control is stabilized, the control instruction value of the pressure feedback upon transition is not necessarily appropriate, and not only the filling of the resin cannot be performed suitably but also there is the possibility that some dispersion may occur in the quality of the molded products.

The present invention has been made in light of the subjects described above, and it is an object of the present invention to provide an electric injection molder and an injection molding method for an electric injection molder wherein, in injection molding by the electric injection molder, stable resin products having a minimized dispersion in the quality can be molded even if the operation environment varies.

DISCLOSURE OF THE INVENTION

In order to attain the object described above, according to the present invention, an electric injecting molder wherein an injection screw disposed in an injection cylinder is driven to move in forward and backward directions by an electric motor to inject resin material in the injection cylinder into a metal mold to fill the metal mold is characterized in that it comprises control means for velocity-controlling the electric motor when the resin material is filled into the metal mold but pressure-controlling the electric motor when the resin material is replenished for shrinkage of the resin after the resin material is filled, position detection means for detecting or estimating the position of the injection screw in the forward and backward direction, velocity detection means for detecting or estimating the velocity of the injection screw in the forward and backward direction, and force detection means for detecting or estimating the force applied to the resin material in the metal mold, and that the control means performs changeover from the velocity control to the pressure control after a position detection value from the position detection means reaches a predetermined position set in advance, and corrects, at least before the changeover from the velocity control to the pressure control upon the velocity control, a velocity target value for the injection screw in response to a force detection value from the force detection means so that the velocity target value for the injection screw may decrease as the force detection value increases to perform velocity feedback control of the electric motor so that the velocity detection value from the velocity detection means may be equal to the velocity target value, but determines, upon the pressure control, the velocity target value in response to a difference between the force detection value and a force target value to be applied to the resin material and velocity feedback controls the electric motor so that the velocity detection value may be equal to the determined velocity target value to perform control so that the force detection value and the force target value may coincide with each other.

Consequently, in the velocity control, the force applied to the resin is detected, and the velocity target value is corrected in response to the detected force and the operation of the electric motor is controlled by the velocity feedback control so that the actual velocity may be equal to the velocity target value. Therefore, the forward movement of the screw can be performed while the force acting upon the screw from the resin is caused to run in in its decreasing direction. Naturally, different from the prior art, changeover between the velocity control and the pressure control is not performed frequently in response to a filling situation of the resin, and stabilized control can be achieved.

Meanwhile, in the pressure control, the detected force and the preset value of the force to be applied to the resin are compared with each other, and the velocity target value is determined in response to a difference between them. Then, the velocity feedback control is performed so that the actual velocity may be equal to the determined velocity target value to control the operation of the electric motor. Consequently, by performing such pressure control as to make the force applied to the resin and the preset value coincide with each other, dwelling can be performed appropriately and the shrinkage by cooling after the resin filling can be corrected appropriately.

Further, where, upon the velocity control, decreasing correction for the velocity target value for the injection screw in response to the force detection value is not performed until the position detection values approaches a value within a predetermined distance to the predetermined position after the velocity control is started, but decreasing correction for the velocity target value for the injection screw is performed in response to the force detection value on condition that the position detection value comes within the predetermined distance to the predetermined position, the advantages that the startup characteristic when the control is started is improved and that a pressure overshoot in the proximity of the changeover position from the velocity control to the pressure control can be prevented are achieved.

Preferably, the control means does not perform, upon the velocity control, decreasing correction for the velocity target value for the injection screw in response to the force detection value until the position detection values approaches a value within a predetermined distance to the predetermined position after the velocity control is started, but performs decreasing correction for the velocity target value for the injection screw in response to the force detection value on condition that the position detection value comes within the predetermined distance to the predetermined position.

Further preferably, when the control means performs decreasing correction of the velocity target value for the injection screw in response to the force detection value, the control means multiplies a decreasing correction amount by a coefficient which gradually increases from 0 to 1 so that the decreasing correction amount may increase in response to the force detection value as the position detection value approaches the predetermined position.

Preferably, the predetermined distance is determined by arithmetic operation based on the velocity target value and the force detection value at the current point of time.

Preferably, the electronic injection molder comprises, as the force detection means, pressure detection means for detecting or estimating the pressure applied to the resin material in the metal mold, and the control means subtracts, upon the velocity control, a value obtained by multiplying a pressure detection value from the force detection means by a pressure proportional gain from a value obtained by multiplying a deviation between a position instruction value for the injection screw and the position detection value from the position detection means by a position proportional gain and uses a resulting value of the subtraction as the velocity target value, but uses, upon the pressure control, a value determined based on a deviation between a pressure instruction value corresponding to the force target value and the pressure detection value from the pressure detection means as the velocity target value.

As an alternative, preferably the electronic injection molder comprises, as the force detection means, force detection means for detecting or estimating the pressure applied to the resin material in the metal mold, and that the control means subtracts, upon the velocity control, a value obtained by multiplying a pressure detection value from the pressure detection means by a pressure proportional gain from a value obtained by multiplying a deviation between a velocity instruction value for the injection screw and the velocity detection value from the velocity detection means by a velocity proportional gain and uses a resulting value of the subtraction as the velocity target value, but uses, upon the pressure control, a value determined based on a deviation between a pressure instruction value corresponding to the force target value and the pressure detection value from the pressure detection means as the velocity target value.

As another alternative, the electric extrusion molder comprises, as the force detection means, pressure detection means for detecting or estimating the pressure applied to the resin material in the metal mold, and that the control means adds, upon the velocity control, a value obtained by multiplying a deviation between a position instruction value for the injection screw and the position detection value from the position detection means by a position proportional gain and a value obtained by multiplying a deviation between a velocity instruction value for the injection screw and the velocity detection value from the velocity detection means by a velocity proportional gain, subtracts a value obtained by multiplying a pressure detection value from the pressure detection means by a pressure proportional gain from a resulting value of the addition and uses a resulting value of the subtraction as the velocity target value, but uses, upon the pressure control, a value determined based on a deviation between a pressure instruction value corresponding to the force target value and the pressure detection value from the pressure detection means as the velocity target value.

Further, according to the present invention, an injection velocity and injection pressure controlling method for an electric injecting molder wherein, when an injection screw disposed in an injection cylinder is driven to move in forward and backward directions by an electric motor to inject resin material in the injection cylinder into a metal mold to fill the metal mold, the electric motor is first velocity-controlled to fill the resin material into the metal mold and, after the resin material is filled, the electric motor is pressure-controlled to replenish the resin material for shrinkage of the resin is characterized in that, at least before changeover from the velocity control to the pressure control upon the velocity control, a velocity target value for the injection screw is corrected in response to a detection value of force applied to the resin material so that the velocity target value for the injection screw may decrease as the force detection value increases to perform velocity feedback control of the electric motor so that a detection value of the velocity of the injection screw may be equal to the velocity target value, and changeover from the velocity control to the pressure control is performed after the position of the injection screw in the forward and backward direction reaches a predetermined position set in advance, but upon the pressure control, the velocity target value is determined in response to a difference between the force detection value and a force target value to be applied to the resin material and the electric motor is velocity feedback controlled so that the velocity detection value may be equal to the determined velocity target value to perform control so that the force detection value and the force target value may coincide with each other.

Preferably, upon the velocity control, decreasing correction for the velocity target value for the injection screw in response to the force detection value is not performed until the position detection values approaches a value within a predetermined distance to the predetermined position after the velocity control is started, but decreasing correction for the velocity target value for the injection screw is performed in response to the force detection value on condition that the position detection value comes within the predetermined distance to the predetermined position.

Further preferably, when decreasing correction of the velocity target value for the injection screw is performed in response to the force detection value, a decreasing correction amount is multiplied by a coefficient which gradually increases from 0 to 1 so that the decreasing correction amount may increase in response to the force detection value as the position detection value approaches the predetermined position.

Preferably, the predetermined distance is determined by arithmetic operation based on the velocity target value and the force detection value at the current point of time.

Also in this instance, preferably the pressure applied to the resin material in the metal mold is used as the force applied to the resin material, and, upon the velocity control, a value obtained by multiplying a detection value of the pressure applied to the resin material by a pressure proportional gain is subtracted from a value obtained by multiplying a deviation between a position instruction value for the injection screw and the position detection value by a position proportional gain and a resulting value of the subtraction is used as the velocity target value, but, upon the pressure control, a value determined based on a deviation between a pressure instruction value corresponding to the force target value and the pressure detection value is used as the velocity target value.

As an alternative, preferably the pressure applied to the resin material in the metal mold is used as the force applied to the resin material, and, upon the velocity control, a value obtained by multiplying a pressure detection value by a pressure proportional gain is subtracted from a value obtained by multiplying a deviation between a velocity instruction value for the injection screw and the velocity detection value by a velocity proportional gain and a resulting value of the subtraction is used as the velocity target value, but, upon the pressure control, a value determined based on a deviation between a pressure instruction value and the pressure detection value is used as the velocity target value.

As another alternative, preferably the pressure applied to the resin material in the metal mold is used as the force applied to the resin material, and that, upon the velocity control, a value obtained by multiplying a deviation between a position instruction value for the injection screw and the position detection value by a position proportional gain and a value obtained by multiplying a deviation between a velocity instruction value for the injection screw and the velocity detection value by a velocity proportional gain are added, and a value obtained by multiplying a detection value of the force applied to the resin material by a pressure proportional gain is subtracted from a resulting value of the addition, and then, a resulting value of the subtraction is used as the velocity target value, but, upon the pressure control, a value determined based on a deviation between a pressure instruction value corresponding to a target value of the force to be applied to the resin material and the pressure detection value is used as the velocity target value.

BRIEF DESCRIPTION OF THE DRAWINGS

FIGS. 10(a) to 10(c) are schematic side elevational view showing a configuration and operation of another general injection molder and show the operation in order of FIGS. 10(a), 10(b) and 10(c);

BEST MODE FOR CARRYING OUT THE INVENTION

In the following, embodiments of the present invention are described with reference to the drawings.

In the following, description is given of embodiments of the present invention with reference to the drawings.

[1] Description of the First Embodiment

Figure 1:
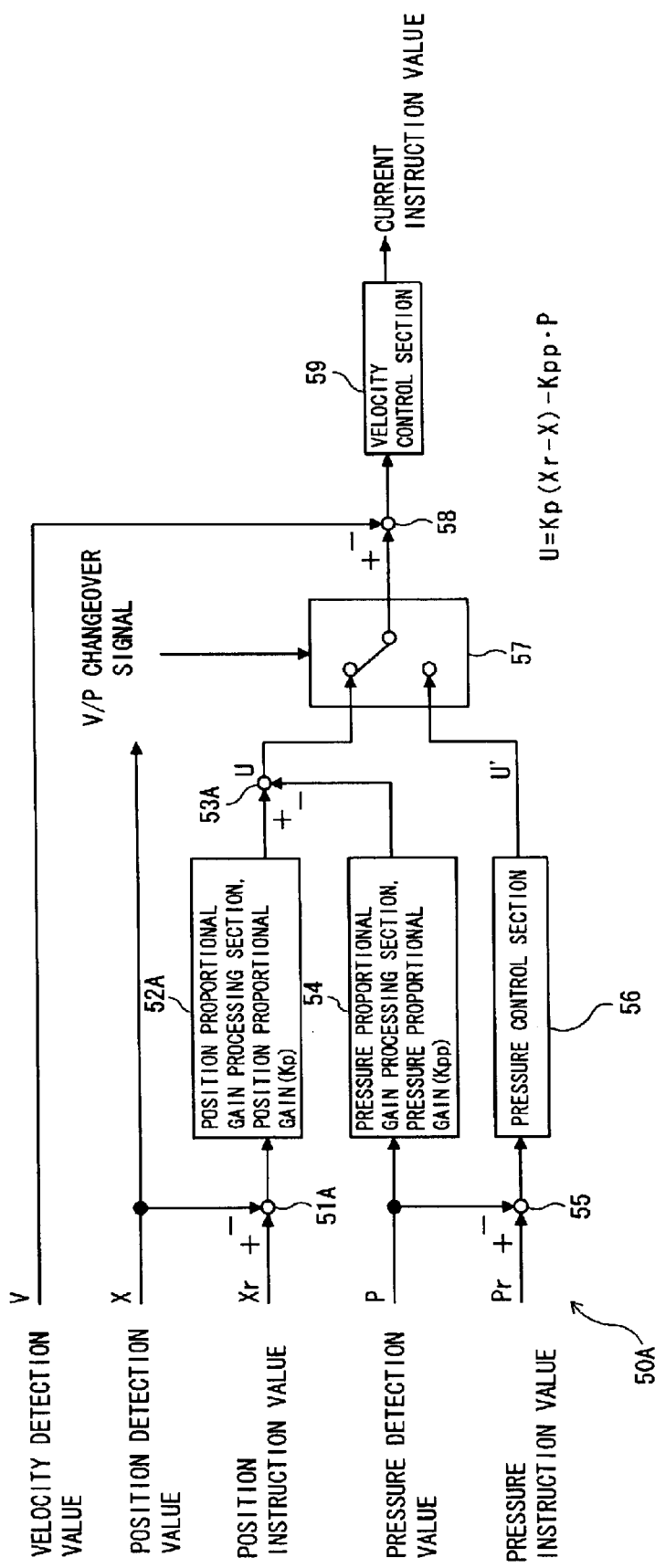
FIG. 1 is a control block diagram of a forward and backward driving system for an injection screw of an electric injection molder according to a first embodiment of the present invention.
Figure 2:
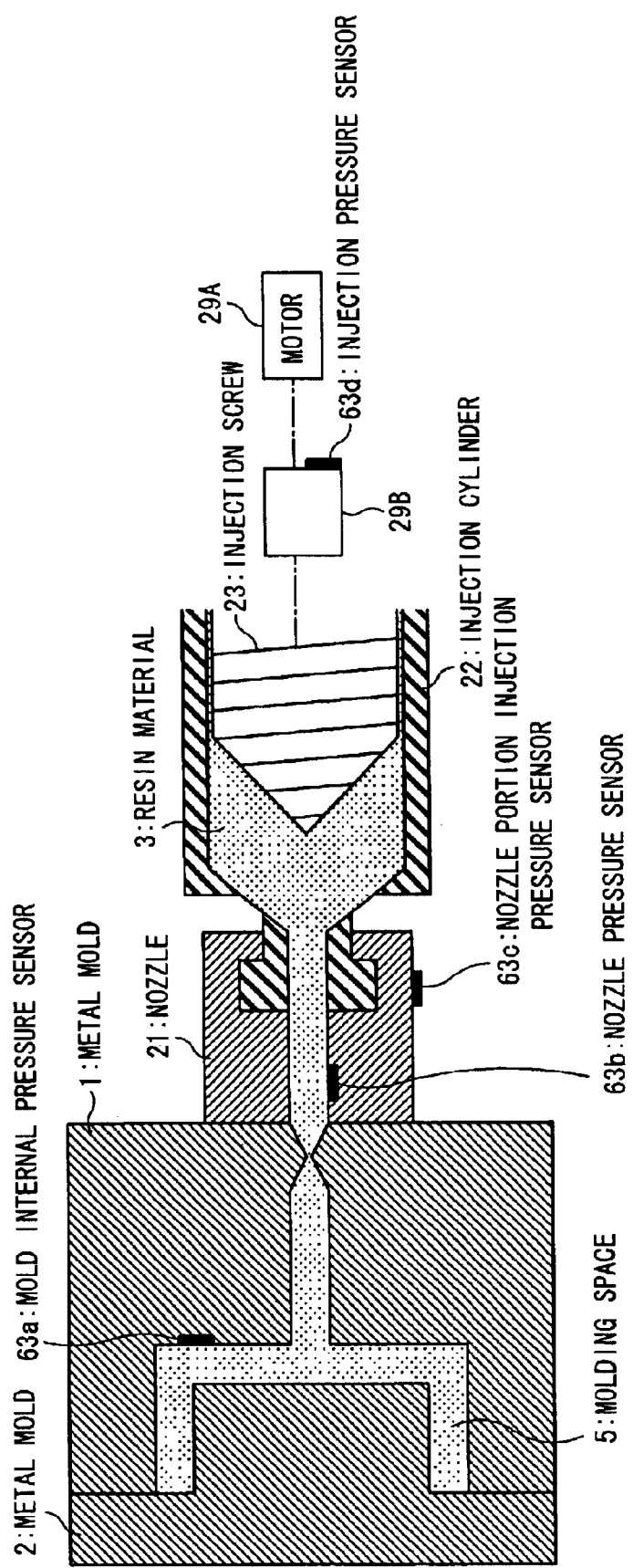
FIG. 2 is a schematic sectional view showing a nozzle of the injection screw of the electric injection molder according to the first embodiment of the present invention.

First, an electric injection molder according to a first embodiment of the present invention is described. FIG. 1 is a control block diagram of a forward and backward driving system for an injection screw of the electric injection molder, and FIG. 2 is a schematic sectional view showing a nozzle of the injection screw. It is to be noted that, since the electric injection molder is configured similarly to the prior art shown in FIGS. 9(a) to 9(c) and 10(a) to 10(c) except the back and forth driving system for the injection screw, simplified description of the same is given.

First, a general configuration of the electric injection molder is described. As shown in FIGS. 9(a) to (c) and 10(a) to 10(c), the injection molder shown includes a mold closing apparatus 10 for stacking two metal molds 1 and 2, and an injection apparatus 20 for injecting and supplying raw resin (resin material) 3 into a space formed between the metal molds 1 and 2.

The mold closing apparatus 10 includes a fixed die plate 11 secured to a base 31 to which the metal mold 1 is attached, a movable die plate 12 having the metal mold 2 attached thereto and movable toward and away from the fixed die plate 11, a tie bar 14 connected at the opposite end portions thereof to the fixed die plate 11 and a connecting plate 13 for guiding the movement of the movable die plate 12, and a boost cylinder 15 for driving the movable die plate 12. The movable die plate 12 includes an extrusion cylinder 16 for taking out a resin product 4 from the metal mold 2 after molding.

The injection apparatus 20 includes an injection cylinder 22 including a nozzle 21, an injection screw 23 inserted for back and forth movement and rotation in the injection cylinder 22, a heater 24 for heating the raw resin 3 in the injection cylinder 22, a table (driving apparatus table) 25 secured to a base 32, a fixed frame 26 secured to the table 25 for supporting the injection cylinder 22 thereon, a movable frame 27 mounted for movement on the table 25 and having the injection screw 23 coupled thereto, a screw rotating motor 28 provided on the movable frame 27 for driving the injection screw 23 to rotate, an injection screw moving mechanism (referred to also as driving apparatus) 29 provided between the fixed frame 26 and the movable frame 27 for moving the injection screw 23 in an axial direction together with the movable frame 27, and a hopper 30 for supplying the raw resin 3 into the injection cylinder 22.

A nozzle forward and backward moving cylinder 33 is provided between the table 25 and the fixed die plate 11 for moving the injection cylinder 22 in an axial direction of the injection cylinder 22 to adjust the position of the nozzle 21 forwardly and backwardly.

Incidentally, in the injection screw moving mechanism 29, the injection screw 23 is driven to move in the backward and forward directions by an electric motor (also referred to as servomotor or simply as motor) 29A. A power transmission mechanism 29B is provided between the motor 29A and the injection screw 23 for reducing the velocity of rotation of the motor 29A, converting the rotation of the reduced velocity into linear movement and transmitting the linear movement to the injection screw 23.

As the mechanism for converting the rotational movement into the linear movement, for example, a ball screw mechanism composed of a ball threaded shaft and a ball threaded nut can be used. In particular, the motor 29A and the ball threaded shaft are both supported on the fixed frame 26 side such that they are rotatable but are stopped from movement in an axial direction while a mechanism for transmitting rotation of the motor 29A at a reduced speed to the ball threaded shaft is provided between the motor 29A and the ball threaded shaft, and the ball threaded nut is formed on the movable frame 27. The axis of the ball threaded shaft and the ball threaded nut is directed in the direction of back and forth movement of the injection screw 23, and the ball threaded shaft and the ball threaded nut are meshed with each other. Consequently, if the ball threaded shaft is rotated by the motor 29A, then the injection screw 23 coupled to the movable frame 27 can be moved in the direction of back and forth movement through the movable frame 27 on which the ball threaded nut held in meshing engagement with the ball threaded shaft is formed.

The motor 29A having the configuration described above is controlled through a control apparatus (control means) 50A as shown in FIG. 1.

Figure 7:
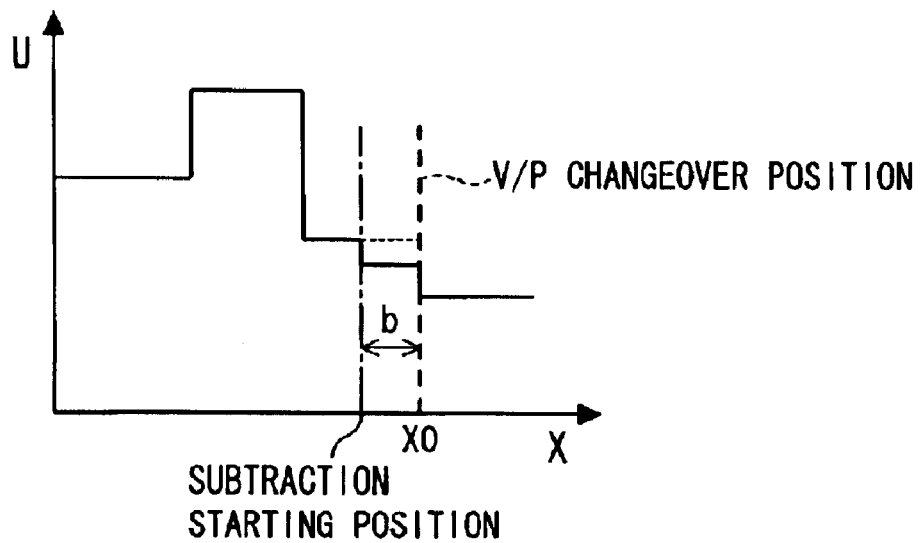
FIG. 7 is a view illustrating control contents of a forward and backward driving system for an injection screw of an electric injection molder according to a sixth embodiment of the present invention.
Figure 11:
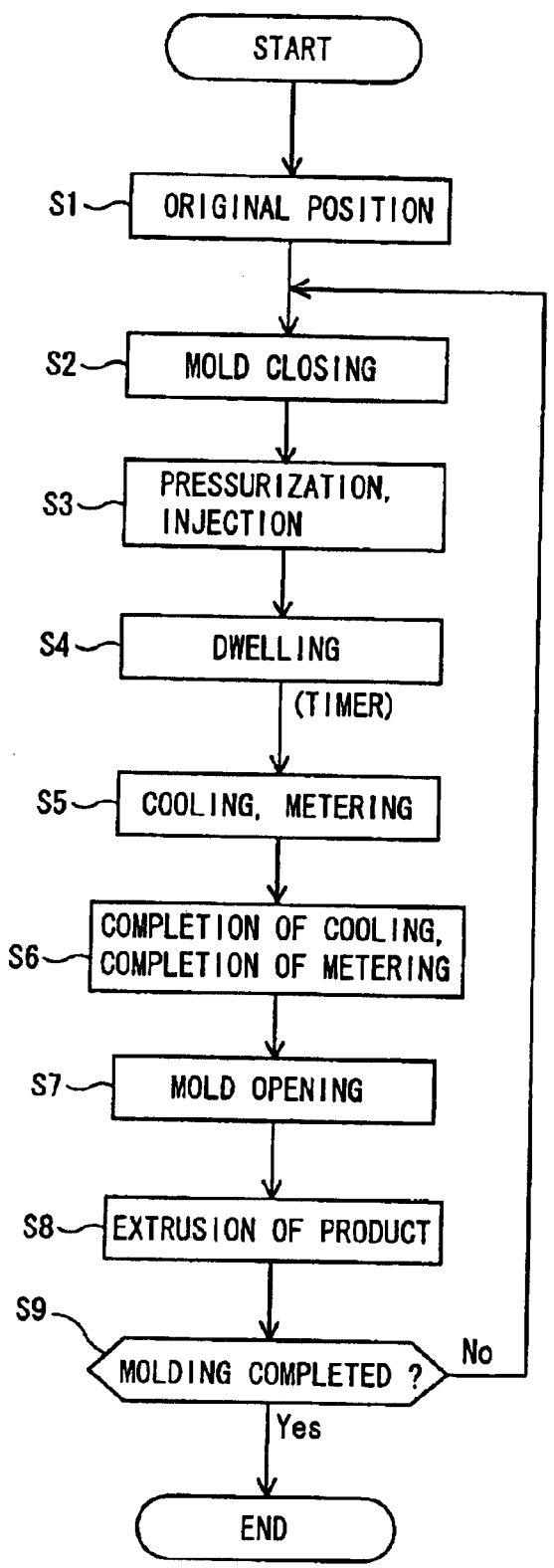
FIG. 11 is a flow chart illustrating operation of a general injection molder.

Upon injection molding, the control apparatus 50A performs, at a resin filling step (pressurization and injection step, step S3 of FIG. 11), velocity control of the motor 29A so that the velocity of movement of the injection screw 23 in the direction of back and forth movement may be equal to a target velocity, but performs, at a dwelling step and so forth after the resin filling (dwelling step and cooling and metering step, steps S4 and S5 of FIG. 7), pressure control of the motor 29A so that the pressure of the resin by the injection screw 23 may be equal to a target pressure.

In particular, at the pressurization and injection step (step S3 of FIG. 11) wherein the resin is filled into the metal mold, if the temperature of the resin drops during filling, then since the resin solidifies, the injection screw 23 is velocity controlled to prevent the solidification of the resin upon such resin filling, but in the dwelling step and the cooling and metering step (steps S4 and S5 of FIG. 11) after the resin filling, in order to correct the shrinkage by cooling of the resin, the injection screw 23 is pressure controlled through the motor 29A so that dwelling may be performed.

In the present control apparatus 50A, the motor 29A is controlled by feedback control both in the velocity control and the pressure control. Also in the pressure control, a velocity target value is set and the motor 29A is velocity controlled with the velocity target value to feed back the velocity or the pressure of the injection screw 23 to effect control although this is naturally applied to the velocity control.

Figure 12:
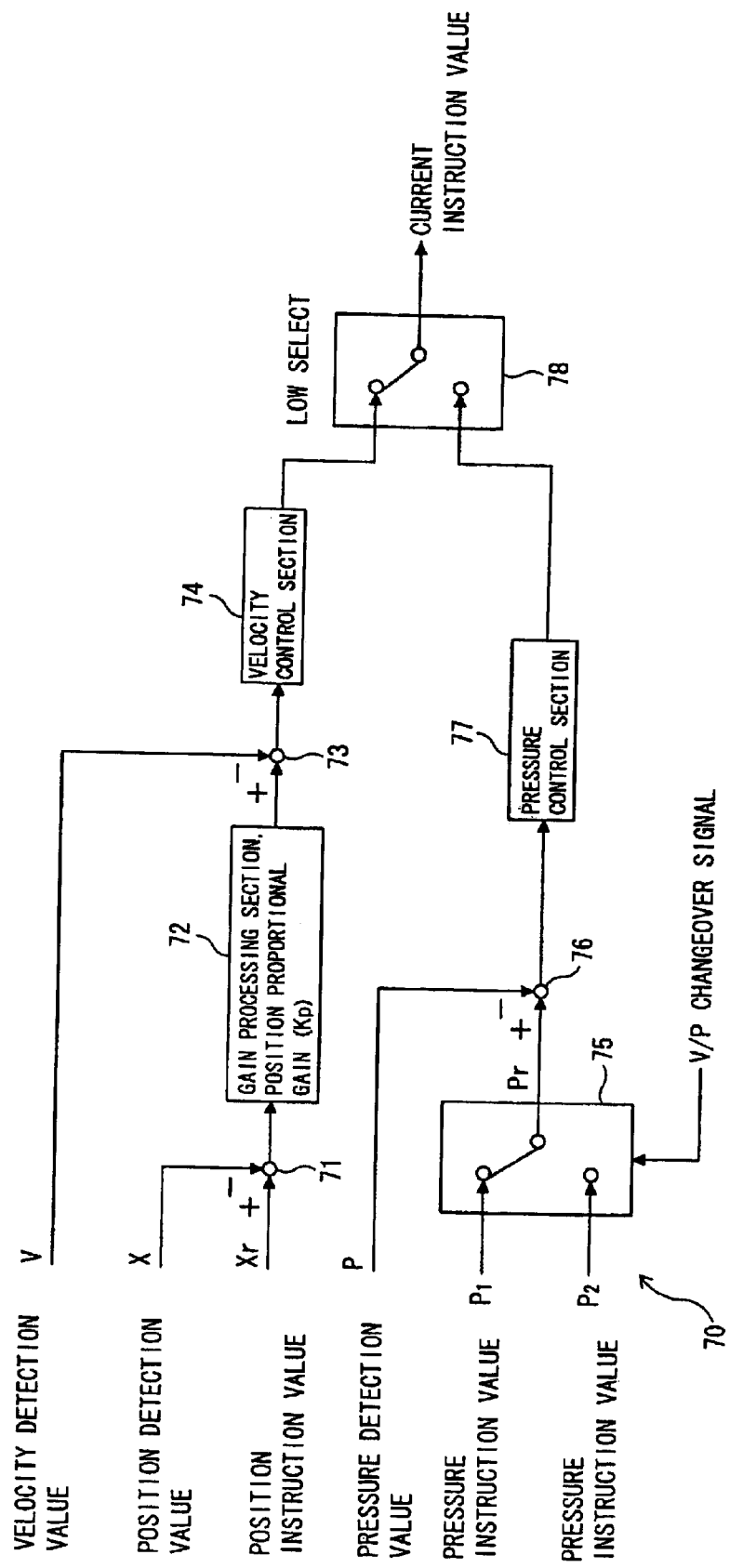
FIG. 12 is a control block diagram of a forward and backward driving system for an injection screw of a conventional electric molder.

The present control apparatus 50A is characterized particularly in setting of the velocity target value upon the velocity control. In particular, while the prior art (refer to FIG. 12) uses a value [$=Kp\cdot(Xr-X)$] obtained by multiplying the position deviation (=position instruction value Xr−position detection value X) by a position proportional gain Kp as it is as the velocity target value U for the velocity feedback, the present control apparatus 50A uses a value obtained by subtracting a value $Kpp\cdot P$ obtained by multiplying the detection value P of the pressure (intra-mold pressure) in the space between the metal molds 1 and 2, which corresponds to the force applied to the resin, by a pressure proportional gain Kpp from the value [$=Kp\cdot(Xr-X)$] obtained by multiplying the position deviation (Xr−X) by the position proportional gain Kp as the velocity target value U for the velocity feedback (refer to the following expression).

$$U=Kp\cdot(Xr-X)-Kpp\cdot P$$

The reason why the value obtained by multiplying the position deviation (Xr−X) by the position proportional gain Kp is corrected by subtraction of the value $Kpp\cdot P$ which varies in accordance with the pressure detection value P which corresponds to the force applied to the resin is that it is intended to lower the target velocity value as the force (pressure) applied to the resin increases.

When the resin is to be filled into the space between the metal molds 1 and 2, the velocity control is first performed to control the speed of advancement of the injection screw 23 so as to be equal to the target velocity to effect filling of the resin. Then, after the resin filling is completed in a general way, the control mode is changed over to the pressure control and the pressure control is performed so that the pressure (force) to be applied to the resin may be equal to the target pressure to effect filling of the resin in order to compensate for the shrinkage of the resin caused by cooling of the resin. However, also during the velocity control, the resin gradually cools, and particularly before the changeover to the pressure control in the final stage of the velocity control, the viscosity of the resin rises and also the resistance against the advancement of the injection screw 23 increases. In this condition, even if the current instruction value for the motor 29A is increased, the speed of rotation of the motor 29A becomes unstable without reaching the target value, and when the control mode is thereafter changed over from the velocity control to the pressure control, the current instruction value for the motor 29A varies suddenly (decreases suddenly). Thus, also the force (pressure) applied to the resin varies suddenly (decreases suddenly), which makes the injection molding unstable.

Therefore, the target velocity value is lowered as the force (pressure) applied to the resin increases so that, upon changeover from the velocity control to the pressure control, the current instruction value for the motor 29A may not vary suddenly thereby to stabilize the force (pressure) applied to the resin. In other words, upon changeover from the velocity control to the pressure control, "running-in control" is performed so that the target velocity value may run in smoothly.

To this end, the velocity control system includes an adder 51A for subtracting a position detection value X from a position instruction value Xr to calculate a position deviation (=Xr−X), a position proportional gain processing section 52A for multiplying the position deviation (Xr−X) by a position proportional gain Kp to convert the position deviation (Xr−X) into a velocity-corresponding instruction value [=Kp·(Xr−X)], a pressure proportional gain processing section 54 for multiplying a pressure detection value P by a pressure proportional gain Kpp to convert the pressure detection value P into a velocity-corresponding correction value (Kpp·P), and an adder 53A for correcting the instruction value [=Kp·(Xr−X)] obtained by the conversion of the position proportional gain processing section 52A with the correction value (Kpp·P) obtained by the conversion of the pressure proportional gain processing section 54 by subtraction to determine a velocity-corresponding instruction value (velocity controlling velocity target value) U.

Meanwhile, the pressure control system includes an adder 55 for subtracting the pressure detection value P from the pressure instruction value Pr to calculate a pressure deviation (=Pr−P), and a pressure control section (pressure controlling velocity target value setting section) 56 for converting the pressure deviation (Pr−P) into a velocity-corresponding instruction value (pressure controlling velocity target value) U'.

It is to be noted that, while the position and the velocity in the foregoing description relate to the injection screw 23, here, not the position and the velocity of the injection screw 23 are directly used as subjects, but the position (rotational angle) and the velocity (rotational velocity) of the motor 29A for driving the injection screw 23 are used as a subject. In this instance, the position of the motor 29A is detected by an encoder (position detection means) not shown, and the velocity of the motor 29A is determined (or in other words, estimated) by time differentiating the position of the motor 29A (this function is referred to as velocity detection means).

Naturally, the position and the velocity of the injection screw 23 may be used directly as subjects with regard to the position and the velocity to be used for the control. Further, in this instance, the position of the injection screw 23 may be detected by a position sensor (position detection means) and used. Further, the position of the injection screw 23 detected by the position sensor (position detection means) may be time differentiated to calculate the velocity (this function is referred to as velocity detection means) and used.

As regards the velocity, the rotational velocity of the motor 29A may be detected directly by means of a rotational velocity sensor and used, or the velocity of movement of the injection screw 23 may be detected directly by means of a velocity sensor and used.

In other words, the position and the velocity of the injection screw 23 or the motor 29A or some parameters corresponding to them may be used as the position and the velocity to be used for the control, and as detection values of the position and the velocity, actual detection values or estimated values based on some detection values such as values obtained by arithmetic operation of detection values may be used.

Meanwhile, as the pressure detection value (actual intra-mold pressure) P which corresponds to the force acting upon the resin, the pressure of the value in a molding space 5 in the metal mold 1 or 2 exhibits the height accuracy as seen in FIG. 2 and is preferable. In this instance, a mold internal pressure sensor (force detection means, pressure detection means) 63a for directly detecting the pressure in the molding space 5 is installed and used for detection of the pressure. However, such a mold internal pressure sensor 63a as just described must be provided for each metal mold, and this requires an increased burden in terms of the operation and the cost for installation of the sensor. Therefore, a pressure which has a correlation to the actual pressure detection value (pressure in the molding space 5) P may be detected and used to estimate the actual mold internal pressure P based on the correlation of the detected pressure with the actual mold internal pressure P.

The pressure having such a correction to the mold internal pressure P may be, as seen in FIG. 2, the pressure (nozzle pressure) in the nozzle 21 at the tip of the injection cylinder 22, the pressure (nozzle portion injection pressure) outwardly of the nozzle 21, the screw propulsion force (driving force (injection pressure) in the back and forth direction of the injection screw 23) or the like. In those cases, a nozzle pressure sensor 63b, a nozzle portion injection pressure sensor 63c or an injection pressure sensor 63d may be provided.

In order to control the motor 29A based on the velocity target value U or U' set in such a manner as described above, the control apparatus 50A includes, as shown in FIG. 1, a changeover section 57 for selectively or switchably using the velocity target value U from the velocity control system and the velocity target value U' from the pressure control system, an adder 58 for subtracting the velocity detection value V from the velocity target value U or U' (in the following description, U is used as a representative of U and U') to calculate a velocity deviation (U−V), and a velocity control section (motor instruction value setting section) 59 for converting the velocity deviation (U−V) into a motor instruction value (current instruction value).

The changeover section 57 performs changeover based on the position detection value X. In particular, upon starting of the control, the changeover section 57 selects the velocity target value U from the velocity control section to perform the velocity control. While the position (rotational angle) of the motor 29A and the position of the injection screw 23 vary as a result of the velocity control, when the position detection value X detected by the position detection means such as an encoder reaches a reference position X0 set in advance, then the control mode is changed over from the velocity control to the pressure control, and the velocity target value U' from the pressure control system is selected to perform the velocity control. It is to be noted that the reference position X0 may be set based on a result of a trial performed in advance or the like.

Since the electric injection molder according to the first embodiment of the present invention is configured in such a manner as described above, in the step of filling resin for injection molding into the metal mold, the control in the forward and backward direction of the injection screw 23 (back and forth movement control) through the motor 29A is performed in accordance with the following procedure (injection velocity and injection pressure control method for the electric injection molder according to the present embodiment).

In particular, the changeover section 57 is placed into a state wherein it selects the velocity target value U from the velocity control system, and the position detection value X is subtracted from the position instruction value Xr to calculate the position deviation (=Xr−X) by the adder 51A. Then, the position deviation (Xr−X) is multiplied by the position proportional gain Kp by the position proportional gain processing section 52A to convert the position deviation (Xr−X) into a velocity-corresponding instruction value [=Kp·(Xr−X)].

Meanwhile, the pressure detection value P is multiplied by the pressure proportional gain Kpp by the pressure proportional gain processing section 54 to covert the pressure detection value P into a velocity-corresponding correction value (=Kpp·P). Then, the instruction value [=Kp·(Xr−X)] is corrected with the correction value (Kpp·P) by subtraction by the adder 53A to determine a velocity-corresponding instruction value (velocity controlling velocity target value) U [U=Kp·(Xr−X)−Kpp·P].

Further, the velocity detection value V is subtracted from the velocity target value U by the adder 58 to calculate a velocity deviation (U−V), and the velocity deviation (U−V) is converted into a motor instruction value (current instruction value) by the velocity control section (motor instruction value setting section) 59. Thus, the motor 29A is controlled with the motor instruction value (current instruction value) so that the velocity (detection value) thereof may be equal to the target value.

The position (rotational angle) of the motor 29A and the position of the injection screw 23 vary through such velocity control. If the position detection value X reaches the reference position X0 set in advance, then the changeover section 57 changes over the control mode from the velocity control to the pressure control and selects the velocity target value U' from the pressure control system to perform the velocity control.

In the pressure control, the adder 55 subtracts the pressure detection value P from the pressure instruction value Pr to calculate a pressure deviation (=Pr−P), and the pressure control section (pressure controlling velocity target value setting section) 56 converts the pressure deviation (Pr−P) into a velocity-corresponding instruction value (pressure controlling velocity target value) U'.

Then, the adder 58 subtracts the velocity detection value V from the velocity target value U' to calculate a velocity deviation (U'−V), and the velocity control section (motor instruction value setting section) 59 converts the velocity deviation (U'−V) into a motor instruction value (current instruction value) and controls the motor 29A with the motor instruction value (current instruction value).

The control of the injection velocity and the injection pressure upon injection molding by the electric injection molder is performed in such a manner as described above. Since the velocity controlling velocity target value U is corrected by subtraction of the correction value (=Kpp·P) based on the pressure detection value P, as the target velocity value decreases as the force (pressure) applied to the resin increases. Consequently, while the control mode is changed over from the velocity control to the pressure control based on the position of the motor 29A or the injection screw 23, the current instruction value for the motor 29A does not exhibit a sudden variation upon such changeover. Therefore, the force (pressure) applied to the resin upon changeover of the control mode can be stabilized, and a sudden fluctuation (pressure peak) of the injection pressure can be suppressed and stabilized resin filling can be performed. Accordingly, filling of resin can be performed stably, and the dispersion of the quality of molded products can be suppressed.

Further, in the pressure control, such pressure control that the force applied to the resin and the preset value may coincide with each other is performed. Consequently, dwelling can be performed appropriately, and the shrink by cooling after the resin filling can be corrected appropriately.

Further, the velocity control and the pressure control are not changed frequently. Also in this regard, the control is stabilized, and filling of resin can be performed stably and the dispersion of the quality of molded products can be suppressed.

[2] Description of the Second Embodiment

Figure 3:
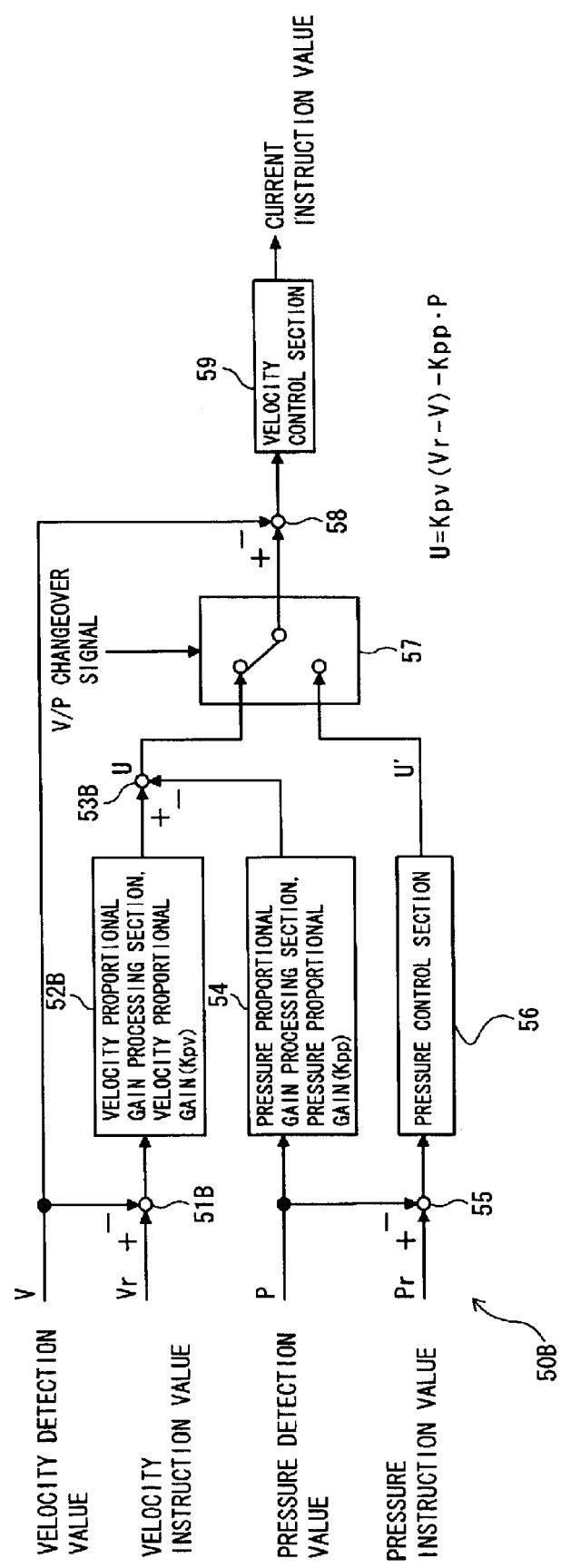
FIG. 3 is a control block diagram of a forward and backward driving system for an injection screw of an electric injection molder according to a second embodiment of the present invention.

Now, an electric injection molder as a second embodiment of the present invention is described. FIG. 3 is a control block diagram of a forward and backward driving system for an injection screw of the electric injection molder. It is to be noted that, since the present electric injection molder is configured similarly to that of the first embodiment except part of the control apparatus (velocity control system), description thereof is omitted or simplified.

According to the control apparatus 50B of the present embodiment, the velocity control system in the present embodiment uses a velocity instruction value Vr and a velocity detection value V while the velocity control system in the first embodiment uses the position instruction value Xr and the position detection value X.

In particular, the velocity control system in the present embodiment includes an adder 51B for subtracting a velocity detection value V from a velocity instruction value Vr to calculate a velocity deviation (=Vr−V), a velocity proportional gain processing section 52B for multiplying the velocity deviation (=Vr−V) by a velocity proportional gain Kpv to convert the velocity deviation (=Vr−V) into a velocity-corresponding instruction value [=Kpv·(Vr−V)], a pressure proportional gain processing section 54 for multiplying a pressure detection value P by a pressure proportional gain Kpp to convert the pressure detection value P into a velocity-corresponding correction value (=Kpp·P), and an adder 53B for correcting the instruction value [=Kpv·(Vr−V)] obtained by the conversion of the velocity proportional gain processing section 52B with the correction value (=Kpp·P) obtained by the conversion of the pressure proportional gain processing section 54 by subtraction to determine a velocity-corresponding instruction value (velocity controlling velocity target value) U (refer to the following expression).

$$U=Kpv·(Vr−V)−Kpp·P$$

In short, while the first embodiment performs velocity control based on position information, the present embodiment performs velocity control based on velocity information.

Since the electric injection molder as the second embodiment of the present invention is configured in such a manner as described above, similar effects to those of the electric injection molder and the injection velocity and injection pressure controlling method for an electric injection molder as the first embodiment are achieved. However, since the second embodiment performs the velocity control based on velocity information while the first embodiment performs the velocity control based on position information, unique effects are achieved.

In particular, while the feedback control based on position information dynamically acts as a "spring-like characteristic", the feedback control based on velocity information dynamically acts as a "damper". Although also the action as a "spring-like characteristic" smoothly varies the movement of the injection screw 23 or the force applied to the resin upon changeover from the velocity control to the pressure control, upon such changeover of the control mode, the resin has raised its viscosity and is being solidified, and upon such viscosity, the feedback control acts as a "damper-like characteristic". The feedback control based on velocity information can rather stabilize the movement of the injection screw 23 or the force applied to the resin. Accordingly, a sudden variation (pressure peak) of the injection pressure can be suppressed further effectively to achieve stabilized resin filling. Consequently, the dispersion of the quality of the molded products can be further suppressed.

[3] Description of the Third Embodiment

Figure 4:
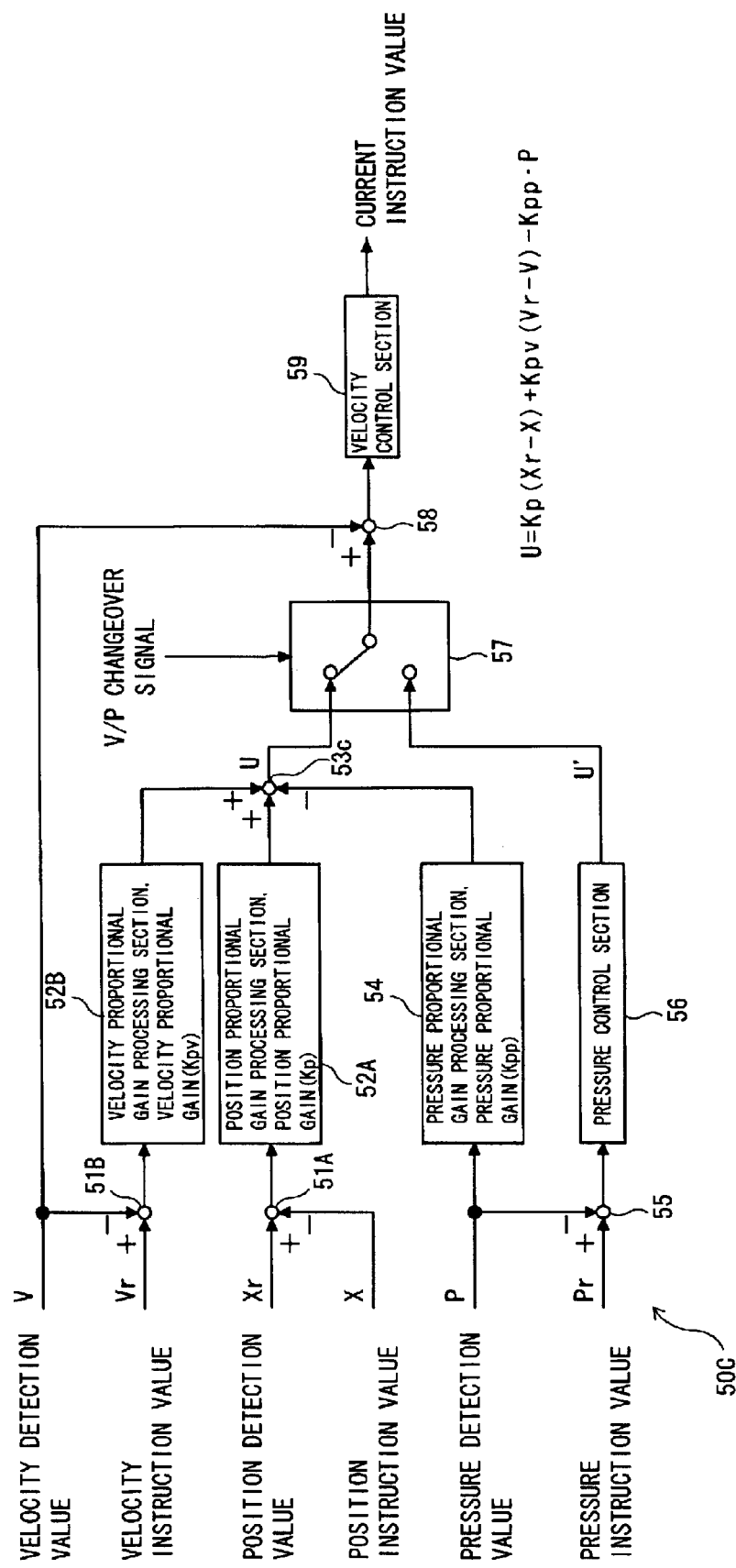
FIG. 4 is a control block diagram of a forward and backward driving system for an injection screw of an electric injection molder according to a third embodiment of the present invention.

Now, an electric injection molder as a third embodiment of the present invention is described. FIG. 4 is a control block diagram of a forward and backward driving system for an injection screw of the electric injection molder. It is to be noted that, since the present electric injection molder is configured in a similar manner to those of the first and second embodiments except part of a control apparatus (except a velocity control system), description of it is omitted or simplified.

In the control apparatus 50C in the present embodiment, the velocity control system is a combination of that in the first embodiment and that in the second embodiment.

In particular, the velocity control system in the present embodiment includes an adder 51A for subtracting a position detection value X from a position instruction value Xr to calculate a position deviation (=Xr−X), a position proportional gain processing section 52A for multiplying the position deviation (=Xr−X) by a position proportional gain Kp to convert the position deviation (=Xr−X) into a velocity-corresponding instruction value [=Kp·(Xr−X)], an adder 51B for subtracting a velocity detection value V from a velocity instruction value Vr to calculate a velocity deviation (=Vr−V), a velocity proportional gain processing section 52B for multiplying the velocity deviation (=Vr−V) by a velocity proportional gain Kpv to obtain a velocity-corresponding instruction value [=Kpv·(Vr−V)], a pressure proportional gain processing section 54 for multiplying a pressure detection value P by a pressure proportional gain Kpp to convert the pressure detection value P into a velocity-corresponding correction value (=Kpp·P), and an adder 53C for correcting the sum [=Kp·(Xr−X)+Kpv·(Vr−V)] of the instruction value [=Kp·(Xr−X)] obtained by the conversion of the position proportional gain processing section 52A and the instruction value [=Kpv·(Vr−V)] obtained by the conversion of the velocity proportional gain processing section 52B with the correction value (Kpp·P) obtained by the conversion of the pressure proportional gain processing section 54 by subtraction to determine a velocity-corresponding instruction value (velocity controlling velocity target value) U (refer to the following expression).

$$U=Kp\cdot(Xr-X)+Kpv\cdot(Vr-V)-Kpp\cdot P$$

Since the electric injection molder as the third embodiment of the present invention is configured in such a manner as described above, both of operation and effects similar to those of the electric injection molder and the injection velocity and injection pressure controlling method as the first embodiment and operation and effects similar to those of the electric injection molder and the injection velocity and injection pressure controlling method as the second embodiment can be achieved.

In particular, since the movement of the injection screw 23 or the force applied to the resin by the motor 29A is used for feedback control based on a "spring-like characteristic" and a "damper-like characteristic", the movement of the injection screw 23 or the force applied to the resin can be further stabilized, and a sudden variation (pressure peak) of the injection pressure can be suppressed further effectively thereby to achieve stabilized resin filling. Consequently, the dispersion of the quality of molded products can be further suppressed.

Incidentally, in the embodiments described above, when the velocity control is performed, the velocity target value for the injection screw is corrected with the pressure detection value (force detection value) by subtraction so that the velocity target value for the injection screw may decrease as the force detection value from the pressure detection means (force detection means) increases.

In particular, upon the velocity control in the first embodiment described above, the velocity-corresponding instruction value [=Kp·(Xr−X)] obtained by multiplying the position deviation (=Xr−X) obtained by subtracting the position detection value X from the position instruction value Xr by the position proportional gain Kp is corrected with the correction value (=Kpp·P) obtained by multiplying the pressure detection value P by the pressure proportional gain Kpp by subtraction to determine a velocity-corresponding instruction value (velocity controlling velocity target value) U [U=Kp·(Xr−X)−Kpp·P], and after the point of time at which the velocity control is started, the velocity controlling velocity target value U is used to perform the velocity control.

Meanwhile, upon the velocity control in the second embodiment described above, the velocity-corresponding instruction value [=Kpv·(Vr−V)] obtained by multiplying the velocity deviation (=Vr−V) obtained by subtracting the velocity detection value V from the velocity instruction value Vr by the velocity proportional gain Kpv is corrected with the correction value (Kpp·P) obtained by multiplying the pressure detection value P by the pressure proportional gain Kpp by subtraction to determine a velocity-corresponding instruction value (velocity controlling velocity target value) U [U=Kpv·(Vr−V)+Kpp·P], and after the point of time at which the velocity control is started, the velocity controlling velocity target value U is used to perform the velocity control.

Further, upon the velocity control in the third embodiment described above, the sum [=Kp·(Xr−X)+Kpv·(Vr−V)] of the velocity-corresponding instruction value [=Kp·(Xr−X)] obtained by multiplying the position deviation (=Xr−X) by the position proportional gain Kp and the velocity-corresponding instruction value [=Kpv·(Vr−V)] obtained by multiplying the velocity deviation (=Vr−V) by the velocity proportional gain Kpv is corrected with the correction value (Kpp·P) obtained by multiplying the pressure detection value P by the pressure proportional gain Kpp by subtraction to determine a velocity-corresponding instruction value (velocity controlling velocity target value) U [U=Kp·(Xr−X)+Kpv·(Vr−V)]+Kpp·P], and after the point of time at which the velocity control is started, the velocity controlling velocity target value U is used to perform the velocity control.

Here, the reason why, in the embodiments, the velocity-corresponding instruction value is corrected by subtraction of the velocity-corresponding correction value (=Kpp·P) which is based on the pressure detection value P is that, even if the control mode is changed over from the velocity control to the pressure control, upon the changeover, the current instruction value for the motor 29A may not vary suddenly by decreasing the target velocity value as the force (pressure) applied to the resin increases.

In order to achieve such an object as just described, it is only necessary that the velocity target value U of the velocity control be in a correction state by subtraction at least upon changeover from the velocity control to the pressure control, and it is not always necessary that the velocity controlling velocity target value U be in a correction state by subtraction from the beginning of the velocity control.

Therefore, a different configuration may possibly be employed wherein, upon the velocity control, the decreasing control of the velocity target value for the injection screw 23 based on the pressure detection value (force detection value) is not performed until the position detection value of the injection screw 23 comes to a position within a predetermined distance to a predetermined position after the velocity control is started, and then, if the position detection value for the injection screw 23 comes to a position within the predetermined distance to the predetermined position, the velocity target value for the injection screw 23 is corrected in a decreasing direction based on the pressure detection value (force detection value).

The following fourth to sixth embodiments have such a configuration as just described.

[4] Description of the Fourth Embodiment

Figure 5:
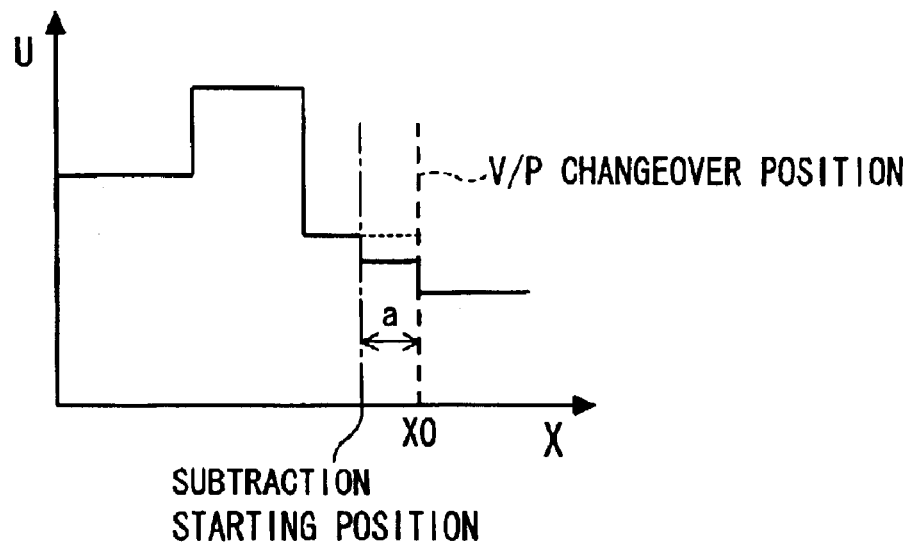
FIG. 5 is a view illustrating control contents of a forward and backward driving system for an injection screw of an electric injection molder according to a fourth embodiment of the present invention.

Here, an electric injection molder and an injection velocity and injection pressure controlling method for an electric injection molder as a fourth embodiment of the present invention are described. FIG. 5 is a view illustrating a timing at which the decreasing correction based on the pressure detection value (force detection value) in the injection screw forward and backward driving system upon velocity control in the fourth embodiment.

The axis of abscissa of FIG. 5 indicates the position X of the injection screw 23, and the axis of ordinate of FIG. 5 indicates the target velocity U for the injection screw 23. Reference character X0 denotes a changeover position (V/P changeover position) from the velocity control to the pressure control.

In the present embodiment, a control apparatus (control means) thereof performs, as seen in FIG. 5, the decreasing correction based on the pressure detection value (force detection value) after the detected position X of the injection screw 23 comes to a distance a set in advance to the V/P changeover position X0, but on the contrary does not perform the decreasing correction based on the pressure detection value (force detection value) until the detected position X of the injection screw 23 comes to the distance a to the V/P changeover position X0 when it sets the velocity controlling velocity target value U.

It is to be noted that, while the distance a can be set arbitrarily by the user, an examination may be performed in advance to set a recommended value or a recommended range for the distance a based on a result of the examination so that it may be suitable to an object electric injection molder and introduce the recommended value or range to the user.

For example, if this is applied to the velocity control in the first embodiment, then till the point of time at which the detected position X of the injection screw 23 comes to the distance a to the V/P changeover position X0 after the point of time at which the velocity control is started, the value [=Kp·(Xr−X)] obtained by multiplying the position deviation (=Xr−X) obtained by subtracting the detected position X from the position instruction value Xr by the position proportional gain Kp is used as the velocity-corresponding instruction value (velocity controlling velocity target value) U [U=Kp·(Xr−X)], but after the detected position X of the injection screw 23 comes to the distance a to the V/P changeover position X0, the value [Kp·(Xr−X)−Kpp·P] obtained by correcting the velocity-corresponding instruction value [=Kp·(Xr−X)] obtained by multiplying the position deviation (=Xr−X) obtained by subtracting the position detection value X from the position instruction value Xr by the position proportional gain Kp with the correction value (=Kpp·P) obtained by multiplying the pressure detection value P by the pressure proportional gain Kpp is used as the velocity-corresponding instruction value (velocity controlling velocity target value) [U=Kp·(Xr−X)+Kpp·P].

Similarly, if the foregoing is applied to the velocity control in the second embodiment, till the point of time at which the detected position X of the injection screw 23 comes to the distance a to the V/P changeover position X0 after the velocity control is started, the value [=Kpv·(Vr−V)] is used as the velocity-corresponding instruction value (velocity controlling velocity target value) U [U=Kpv·(Vr−V)], but after the detected position X of the injection screw 23 comes to the distance a to the V/P changeover position X0, the value [Kpv·(Vr−V)−Kpp·P] is used as the velocity-corresponding instruction value (velocity controlling velocity target value) [U=Kpv·(Vr−V)−Kpp·P].

Similarly, if the foregoing is applied to the velocity control in the third embodiment, till the point of time at which the detected position X of the injection screw 23 comes to the distance a to the V/P changeover position X0 after the velocity control is started, the value [=Kp·(Xr−X)+Kpv·(Vr−V)] is used as the velocity-corresponding instruction value (velocity controlling velocity target value) U [U=Kp·(Xr−X)+Kpv·(Vr−V)], but after the detected position X of the injection screw 23 comes to the distance a to the V/P changeover position X0, the value [Kp·(Xr−X)+Kpv·(Vr−V)−Kpp·P] is used as the velocity-corresponding instruction value (velocity controlling velocity target value) [U=Kp·(Xr−X)+Kpv·(Vr−V)−Kpp·P].

Since the electric injection molder and the injection velocity and injection pressure controlling method for an electric injection molder as the fourth embodiment of the present invention are configured in such a manner as described above, the decreasing correction of the velocity target value based on the pressure detection value (force detection value) upon the velocity control is started at a stage at which the detected position X of the injection screw 23 comes to a certain distance to the V/P changeover position X0. Thus, upon the velocity control, the decreasing correction is not performed, but when the control is started (when the velocity control is started), preferentially the velocity target value follows up the velocity setting.

Therefore, in addition to the effect of the first to third embodiments described above, that is, the effect that a sudden variation (pressure peak) of the injection pressure can be suppressed further effectively to make it possible to perform stabilized resin filling, effects that the startup characteristic when the control is started is improved and that a pressure overshoot in the proximity of the V/P changeover position can be prevented are achieved.

[5] Description of the Fifth Embodiment

Figure 6:
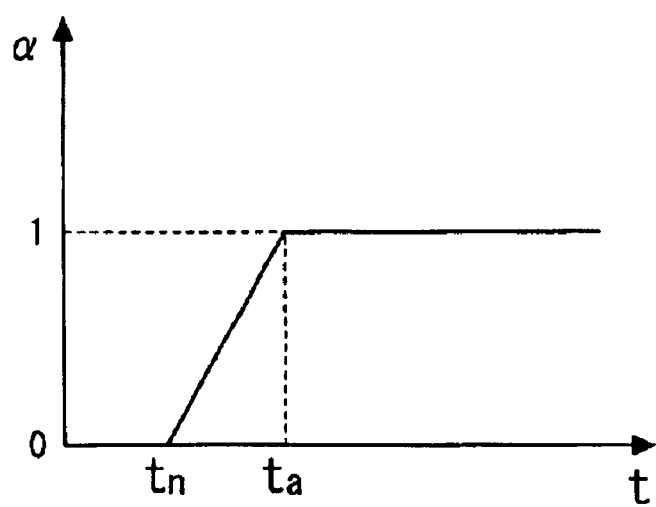
FIG. 6 is a view illustrating a correction coefficient of a forward and backward driving system for an injection screw of an electric injection molder according to a fifth embodiment of the present invention.

Now, an electric injection molder and an injection velocity and injection pressure controlling method for an electric injection molder as a fifth embodiment of the present invention are described. FIG. 6 is a view illustrating a correction coefficient for use for velocity control of an injection screw forward and backward driving system in the fifth embodiment.

In the present embodiment, upon such decreasing control upon velocity control as described above, as represented by the following expressions, a decreasing correction amount is multiplied by a variable correction coefficient α which increases from 0 to 1 as the time elapses, for example, as illustrated in FIG. 6.

Corresponding to the first embodiment:

$$U=Kp\cdot(Xr-X)-\alpha\cdot Kpp\cdot P$$

Corresponding to the second embodiment:

$$U=Kpv\cdot(Vr-V)-\alpha\cdot Kpp\cdot P$$

Corresponding to the third embodiment:

$$U=Kp\cdot(Xr-X)+Kpv\cdot(Vr-V)-\alpha\cdot Kpp\cdot P$$

It is to be noted that, although, for example, as shown in FIG. 6, the correction coefficient α is 0 at the point $t_n$ of time and thereafter increases linearly until it becomes equal to 1 at the point $t_a$ of time, the point $t_n$ of time may be set to the decreasing correction starting point of time upon the velocity control, and the point $t_a$ of time may be set from data obtained in advance or the like so that it may be a point of time prior to a point of time at which the injection screw 23 comes to the V/P changeover position.

Further, if the point of time at which the detected position X of the injection screw 23 comes to the distance a to the V/P changeover position X0 is used as the point $t_n$ of time at which the correction coefficient α rises (becomes greater than 0), then this corresponds to addition of the present configuration to the fourth embodiment. Also this configuration is preferable.

Since the electric injection molder and the injection velocity and injection pressure controlling method for an electric injection molder as the fifth embodiment of the present invention is configured in such a manner as described above, in addition to operation and effects similar to those of the first to fourth embodiments, changeover from the velocity control to the pressure control can be performed further smoothly because, due to the correction coefficient α, although the amount of the decreasing correction is small when the decreasing correction is started, the decreasing correction is increased gradually as the position of the injection screw 23 approaches the V/P changeover position.

[6] Description of the Sixth Embodiment

Figure 8:
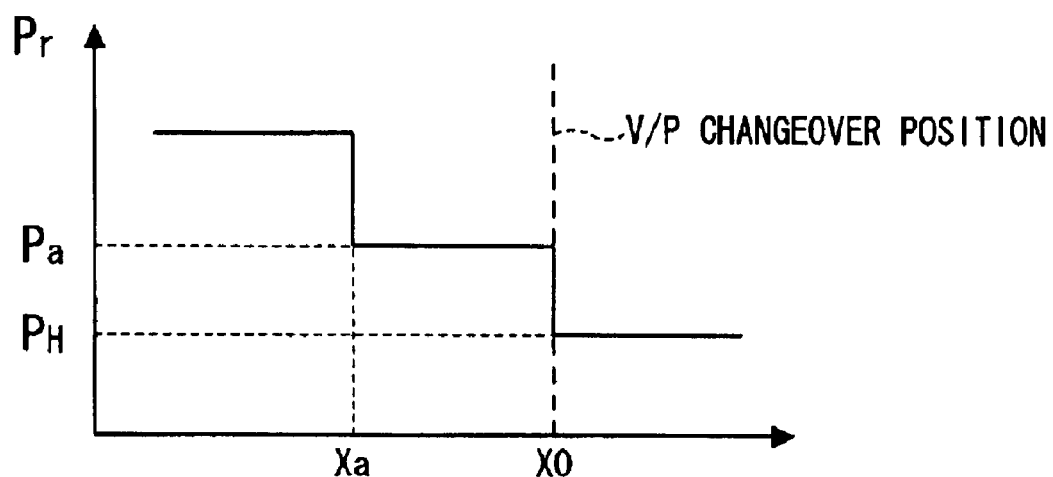
FIG. 8 is a view illustrating control contents of the forward and backward driving system for the injection screw of the electric injection molder of the sixth embodiment according to the present invention.
Figure 9A:
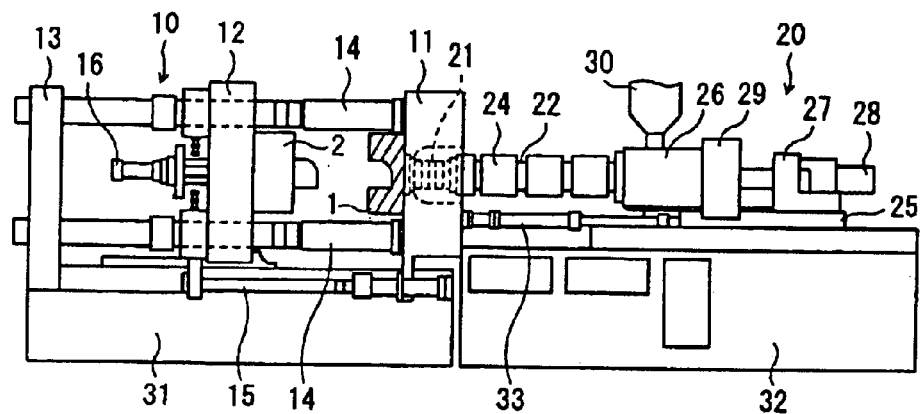
FIGS. 9(a) to 9(c) are schematic side elevational view showing a configuration and operation of a general injection molder and show the operation in order of FIGS. 9(a), 9(b) and 9(c)
Figure 9B:
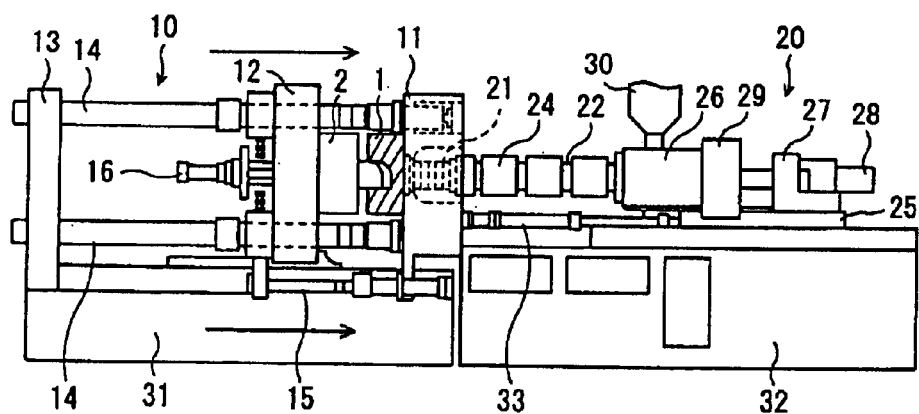
Figure 9C:
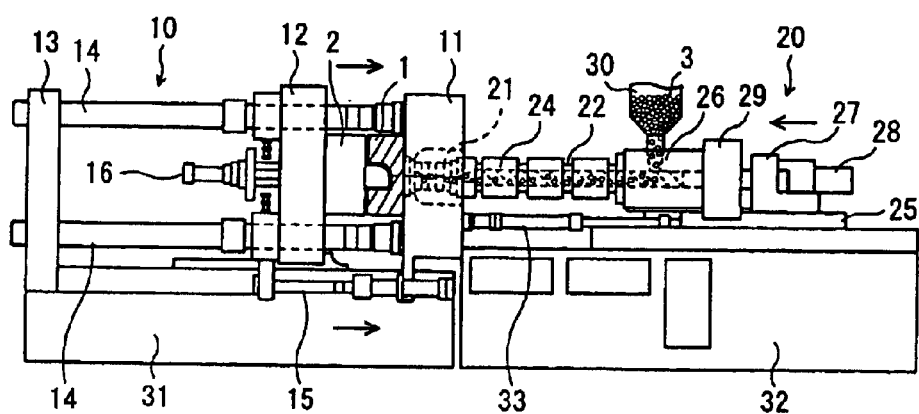

Now, an electric injection molder and an injection velocity and injection pressure controlling method for an electric injection molder as a sixth embodiment of the present invention are described. FIG. 7 is a view illustrating a timing at which decreasing correction for an injection screw forward and backward driving system upon velocity control of the sixth embodiment based on the pressure detection value (force detection value) is performed, and corresponds to FIG. 5. FIG. 8 is a view illustrating setting of the timing.

In the present embodiment, as seen in FIG. 7, similarly as in the fourth embodiment, when the detected position X of the injection screw 23 comes to a position spaced by a distance b to the V/P changeover position X0, decreasing correction based on the pressure detection value (force detection value) is performed, but on the contrary, until the detected position X of the injection screw 23 comes to the distance b to the V/P changeover position X0, decreasing correction based on the pressure detection value (force detection value) is not performed, when it sets the velocity controlling velocity target value U.

While the distance a in the fourth embodiment is a fixed value set in advance, the distance b in the present embodiment is determined by arithmetic operation based on the velocity target value and the pressure detection value (force detection value) at the point of time (at the point of time in each control cycle).

For example, when the detected position X of the injection screw 23 is Xa and the pressure instruction value Pr is Pa at a certain point of time, where an assumed value of the pressure instruction value Pr in the proximity of the V/P changeover position X0 is represented by $P_H$ and the maximum pressure value by the injection screw 23 is represented by Pmax, the distance b can be calculated in accordance with the following expression:

$$b=(|Pa-P_H|/Pmax)\cdot(X0-Xa)$$

The reason why the distance b is set in this manner is that, since a dwelling step is entered at a point of time at which the V/P changeover position is reached, it is necessary to set the starting position of running-in control (that is, decreasing correction control) at a position forwardly of the V/P changeover position in accordance with the deviation between a dwell pressure target value set by the user and the pressure detection value. Therefore, the starting position of the running-in control (that is, decreasing correction control) is set between the position at which the pressure setting or velocity setting value is changed immediately prior to the changeover to the dwelling step and the V/P changeover position. Also it is a reason that, when the deviation between the dwell pressure target value and the pressure detection value is great, the running-in control operates more effectively if the decreasing correction is started at a point of time as early as possible with respect to the V/P changeover potion than when the deviation is small.

Since the electric injection molder and the injection velocity and injection pressure controlling method for an electric injection molder as the sixth embodiment of the present invention is configured in such a manner as described above, in addition to operation and effects similar to those of the fourth embodiment, since the timing at which the decreasing correction based on the pressure detection value (force detection value) is started is set to an earlier timing as the pressure instruction value Pr increases, the changeover from the velocity control to the pressure control can be performed further smoothly.

While embodiments of the present invention are described, the present invention is not limited to the embodiments described above and can be carried out in various forms without departing from the scope of the present invention.

For example, the fifth embodiment and the sixth embodiment may be combined.

INDUSTRIAL APPLICABILITY OF THE INVENTION

As described above, according to the present invention, in velocity control, a sudden variation (pressure peak) of the injection pressure can be suppressed to allow stabilized resin filling to be performed, and changeover between the velocity control and the pressure control is not performed very frequently in response to a filling situation of resin and stabilized control is achieved. In the pressure control, such pressure control that the force applied to the resin coincides with a preset value, and dwelling can be performed appropriately and the shrinkage by cooling after the resin filling can be corrected appropriately. Further, where, upon the velocity control, decreasing correction for the velocity target value for the injection screw based on the force detection value is not performed until the position detection value after the velocity control is started comes to a position within a predetermined distance to the predetermined position whereas the decreasing correction is performed for the velocity target value for the injection screw based on the force detection value on condition that the position detection value comes to a position within the predetermined distance to the predetermined position, advantages that the startup characteristic when the control is started is improved and that a pressure overshoot in the proximity of the changeover position from the velocity control to the pressure control can be prevented are achieved.

Accordingly, the present invention can be applied suitably to an electric injection molder wherein an injection screw is driven to move back and forth by an electric motor and the electric motor is controlled in two control modes of velocity control and pressure control, and it is believed that the present invention is very useful.

What is claimed is:

1. An electric injecting molder wherein an injection screw disposed in an injection cylinder is driven to move in forward and backward directions by an electric motor to inject resin material in said injection cylinder into a metal mold to fill said metal mold, said electric injecting molder comprising:
    control means for velocity-controlling said electric motor when the resin material is filled into said metal mold but pressure-controlling said electric motor when the resin material is replenished for shrinkage of the resin after the resin material is filled;
    position detection means for detecting or estimating the position of said injection screw in the forward and backward direction;
    velocity detection means for detecting or estimating the velocity of said injection screw in the forward and backward direction; and
    force detection means for detecting or estimating the force applied to the resin material in said metal mold, and that said control means
    performs changeover from the velocity control to the pressure control after a position detection value from said position detection means reaches a predetermined position set in advance, and
    corrects, at least before the changeover from the velocity control to the pressure control upon the velocity control, a velocity target value for said injection screw in response to a force detection value from said force detection means so that the velocity target value for said injection screw may decrease as the force detection value increases to perform velocity feedback control of said electric motor so that the velocity detection value from said velocity detection means may be equal to the velocity target value, but
    determines, upon the pressure control, the velocity target value in response to a difference between the force detection value and a force target value to be applied to the resin material and velocity feedback controls said electric motor so that the velocity detection value may be equal to the determined velocity target value to perform control so that the force detection value and the force target value may coincide with each other.

2. An electric injection molder as set forth in claim 1, wherein
    said control means does not perform, upon the velocity control, decreasing correction for the velocity target value for said injection screw in response to the force detection value until the position detection values approaches a value within a predetermined distance to the predetermined position after the velocity control is started, but performs decreasing correction for the velocity target value for said injection screw in response to the force detection value on condition that the position detection value comes within the predetermined distance to the predetermined position.

3. An electric injection molder as set forth in claim 2, wherein,
    when said control means performs decreasing correction of the velocity target value for said injection screw in response to the force detection value, said control means multiplies a decreasing correction amount by a coefficient which gradually increases from 0 to 1 so that the decreasing correction amount may increase in response to the force detection value as the position detection value approaches the predetermined position.

4. An electric injection molder as set forth in claim 2, wherein the predetermined distance is determined by arithmetic operation based on the velocity target value and the force detection value at the current point of time.

5. An electronic injection molder as set forth in claim 1, further comprising
    as said force detection means, pressure detection means for detecting or estimating the pressure applied to the resin material in said metal mold, and that said control means
    subtracts, upon the velocity control, a value obtained by multiplying a pressure detection value from said force detection means by a pressure proportional gain from a value obtained by multiplying a deviation between a position instruction value for said injection screw and the position detection value from said position detection means by a position proportional gain and uses a resulting value of the subtraction as the velocity target value, but
    uses, upon the pressure control, a value determined based on a deviation between a pressure instruction value corresponding to the force target value and the pressure detection value from said pressure detection means as the velocity target value.

6. An electronic injection molder as set forth in claim 1, further comprising
    as said force detection means, force detection means for detecting or estimating the pressure applied to the resin material in said metal mold, and that said control means
    subtracts, upon the velocity control, a value obtained by multiplying a pressure detection value from said pressure detection means by a pressure proportional gain from a value obtained by multiplying a deviation between a velocity instruction value for said injection screw and the velocity detection value from said velocity detection means by a velocity proportional gain and uses a resulting value of the subtraction as the velocity target value, but
    uses, upon the pressure control, a value determined based on a deviation between a pressure instruction value corresponding to the force target value and the pressure detection value from said pressure detection means as the velocity target value.

7. An electric injection molder as set forth in claim 1, further comprising
  as said force detection means, pressure detection means for detecting or estimating the pressure applied to the resin material in said metal mold, and that said control means
  adds, upon the velocity control, a value obtained by multiplying a deviation between a position instruction value for said injection screw and the position detection value from said position detection means by a position proportional gain and a value obtained by multiplying a deviation between a velocity instruction value for said injection screw and the velocity detection value from said velocity detection means by a velocity proportional gain, subtracts a value obtained by multiplying a pressure detection value from said pressure detection means by a pressure proportional gain from a resulting value of the addition and uses a resulting value of the subtraction as the velocity target value, but
  uses, upon the pressure control, a value determined based on a deviation between a pressure instruction value corresponding to the force target value and the pressure detection value from said pressure detection means as the velocity target value.

8. An injection velocity and injection pressure controlling method for an electric injecting molder wherein, when an injection screw disposed in an injection cylinder is driven to move in forward and backward directions by an electric motor to inject resin material in said injection cylinder into a metal mold to fill said metal mold, said electric motor is first velocity-controlled to fill the resin material into said metal mold and, after the resin material is filled, said electric motor is pressure-controlled to replenish the resin material for shrinkage of the resin, characterized in that wherein
  at least before changeover from the velocity control to the pressure control upon the velocity control, a velocity target value for said injection screw is corrected in response to a detection value of force applied to the resin material so that the velocity target value for said injection screw may decrease as the force detection value increases to perform velocity feedback control of said electric motor so that a detection value of the velocity of said injection screw may be equal to the velocity target value, and
  changeover from the velocity control to the pressure control is performed after the position of said injection screw in the forward and backward direction reaches a predetermined position set in advance, but
  upon the pressure control, the velocity target value is determined in response to a difference between the force detection value and a force target value to be applied to the resin material and said electric motor is velocity feedback controlled so that the velocity detection value may be equal to the determined velocity target value to perform control so that the force detection value and the force target value may coincide with each other.

9. An injection velocity and injection pressure controlling method for an electric injection molder as set forth in claim 8, wherein
  upon the velocity control, decreasing correction for the velocity target value for said injection screw in response to the force detection value is not performed until the position detection values approaches a value within a predetermined distance to the predetermined position after the velocity control is started, but decreasing correction for the velocity target value for said injection screw is performed in response to the force detection value on condition that the position detection value comes within the predetermined distance to the predetermined position.

10. An injection velocity and injection pressure controlling method for an electric injection molder as set forth in claim 9, wherein
  when decreasing correction of the velocity target value for said injection screw is performed in response to the force detection value, a decreasing correction amount is multiplied by a coefficient which gradually increases from 0 to 1 so that the decreasing correction amount may increase in response to the force detection value as the position detection value approaches the predetermined position.

11. An injection velocity and injection pressure controlling method for an electric injection molder as set forth in claim 9, wherein the predetermined distance is determined by arithmetic operation based on the velocity target value and the force detection value at the current point of time.

12. An injection velocity and injection pressure controlling method for an electronic injection molder as set forth in claim 8, wherein
  the pressure applied to the resin material in said metal mold is used as the force applied to the resin material, and that,
  upon the velocity control, a value obtained by multiplying a detection value of the pressure applied to the resin material by a pressure proportional gain is subtracted from a value obtained by multiplying a deviation between a position instruction value for said injection screw and the position detection value by a position proportional gain and a resulting value of the subtraction is used as the velocity target value, but,
  upon the pressure control, a value determined based on a deviation between a pressure instruction value corresponding to the force target value and the pressure detection value is used as the velocity target value.

13. An injection velocity and injection pressure controlling method for an electronic injection molder as set forth in claim 8, wherein
  the pressure applied to the resin material in said metal mold is used as the force applied to the resin material, and that,
  upon the velocity control, a value obtained by multiplying a pressure detection value by a pressure proportional gain is subtracted from a value obtained by multiplying a deviation between a velocity instruction value for said injection screw and the velocity detection value by a velocity proportional gain and a resulting value of the subtraction is used as the velocity target value, but,
  upon the pressure control, a value determined based on a deviation between a pressure instruction value and the pressure detection value is used as the velocity target value.

14. An injection velocity and injection pressure controlling method for an electric extrusion molder as set forth in claim 8, wherein
  the pressure applied to the resin material in said metal mold is used as the force applied to the resin material, and that,
  upon the velocity control, a value obtained by multiplying a deviation between a position instruction value for said injection screw and the position detection value by a position proportional gain and a value obtained by multiplying a deviation between a velocity instruction value for said injection screw and the velocity detection value by a velocity proportional gain are added, and a value obtained by multiplying a detection value of the force applied to the resin material by a pressure proportional gain is subtracted from a resulting value of the addition, and then, a resulting value of the subtraction is used as the velocity target value, but, upon the pressure control, a value determined based on a deviation between a pressure instruction value corresponding to a target value of the force to be applied to the resin material and the pressure detection value is used as the velocity target value.

15. An electric injecting molder, comprising:

an injection screw, which is disposed in an injection cylinder, driven to move in forward and backward directions by an electric motor to inject resin material in said injection cylinder into a metal mold to fill said metal mold;

a position detector configured to detect or estimate the position of said injection screw in the forward and backward direction, said position detector having an encoder configured to detect the position of the motor;

a velocity detector configured to detect or estimate the velocity of said injection screw in the forward and backward direction, said velocity detector having an encoder configured to detect the position of the motor and a calculator time configured to differentiate the position of the motor detected by the encoder;

a force detector configured to detect or estimate the force applied to the resin material in said metal mold, said force detector having a mold internal pressure sensor configured to directly detect the pressure in the molding space in said metal mold; and a controller, which has a velocity-control section configured to velocity control said electric motor when the resin material is filled into said metal mold, a pressure control section configured to pressure-control said electric motor when the resin material is replenished for shrinkage of the resin after the resin material is filled, and a changeover section configured to perform a changeover from the velocity control to the pressure control after a position detection value from said position detector reaches a predetermined position set in advance, wherein said velocity control section corrects, at least before the changeover from the velocity control to the pressure control upon the velocity control, a velocity target value for said injection screw in response to a force detection value from said force detector so that the velocity target value for said injection screw may decrease as the force detection value increases to perform velocity feedback control of said electric motor so that the velocity detection value from said velocity detector may be equal to the velocity target value, and said pressure-control section determines, upon the pressure control, the velocity target value in response to a difference between the force detection value and a force target value to be applied to the resin material, and velocity feedback controls said electric motor so that the velocity detection value may be equal to the determined velocity target value to perform control so that the force detection value and the force target value may coincide with each other.

* * * * *